(12) United States Patent
Honda

(10) Patent No.: US 11,183,735 B2
(45) Date of Patent: Nov. 23, 2021

(54) SEPARATOR FOR A NON-AQUEOUS SECONDARY BATTERY, AND NON-AQUEOUS SECONDARY BATTERY

(71) Applicant: TEIJIN LIMITED, Osaka (JP)

(72) Inventor: Susumu Honda, Osaka (JP)

(73) Assignee: TEIJIN LIMITED, Osaka (JP)

( * ) Notice: Subject to any disclaimer, the term of this patent is extended or adjusted under 35 U.S.C. 154(b) by 0 days.

(21) Appl. No.: 15/930,586

(22) Filed: May 13, 2020

(65) Prior Publication Data

US 2020/0274121 A1  Aug. 27, 2020

Related U.S. Application Data

(63) Continuation of application No. 15/552,847, filed as application No. PCT/JP2016/059011 on Mar. 22, 2016, now abandoned.

(30) Foreign Application Priority Data

Mar. 24, 2015  (JP) ................................ 2015-061570
Jun. 1, 2015  (JP) ................................ 2015-111461

(51) Int. Cl.
  *H01M 50/44*  (2021.01)
  *H01M 50/411*  (2021.01)
  (Continued)

(52) U.S. Cl.
  CPC ............. *H01M 50/44* (2021.01); *C08F 14/22* (2013.01); *C08K 3/346* (2013.01); *C09J 7/26* (2018.01);
  (Continued)

(58) Field of Classification Search
  CPC ........................... H01M 50/10; H01M 10/052
  See application file for complete search history.

(56) References Cited

U.S. PATENT DOCUMENTS

| 5,922,493 A | 7/1999 | Humphrey, Jr. et al. |
| 2003/0114614 A1 | 6/2003 | Wille et al. |

(Continued)

FOREIGN PATENT DOCUMENTS

| CN | 102468465 A | 5/2012 |
| CN | 104051776 A | 9/2014 |

(Continued)

OTHER PUBLICATIONS

Communication dated Sep. 12, 2019, from the State Intellectual Property Office of the P.R.C in application No. 201680010432.8.

(Continued)

*Primary Examiner* — Kenneth J Douyette
(74) *Attorney, Agent, or Firm* — Sughrue Mion, PLLC

(57) ABSTRACT

A separator for a non-aqueous secondary battery, the separator including: a porous substrate; and an adhesive porous layer provided on one or both sides of the porous substrate and including a polyvinylidene fluoride-based resin, the adhesive porous layer would exhibit a ratio of an area intensity of a β-phase-crystal-derived peak of the polyvinylidene fluoride-based resin to a sum of an area intensity of an α-phase-crystal-derived peak of the polyvinylidene fluoride-based resin and the area intensity of the β-phase-crystal-derived peak of the polyvinylidene fluoride-based resin of from 10% to 100% when an x-ray diffraction spectrum is obtained by performing measurement by an x-ray diffraction method.

12 Claims, 1 Drawing Sheet

(51) Int. Cl.
  *H01M 50/449* (2021.01)
  *C09J 7/26* (2018.01)
  *C09J 7/30* (2018.01)
  *C09J 127/16* (2006.01)
  *H01M 50/46* (2021.01)
  *C08F 14/22* (2006.01)
  *C08K 3/34* (2006.01)
  *H01M 10/052* (2010.01)

(52) U.S. Cl.
  CPC .............. *C09J 7/30* (2018.01); *C09J 127/16* (2013.01); *H01M 10/052* (2013.01); *H01M 50/411* (2021.01); *H01M 50/449* (2021.01); *H01M 50/461* (2021.01); *C09J 2203/33* (2013.01); *C09J 2427/00* (2013.01)

(56) References Cited

U.S. PATENT DOCUMENTS

| | | | |
|---|---|---|---|
| 2003/0175583 A1 | 9/2003 | Suzuki | |
| 2006/0088762 A1* | 4/2006 | Okamoto | H01M 50/183 429/142 |
| 2006/0141358 A1 | 6/2006 | Yun et al. | |
| 2010/0297490 A1 | 11/2010 | Takami et al. | |
| 2012/0115009 A1 | 5/2012 | Okuno et al. | |
| 2013/0089771 A1* | 4/2013 | Nishikawa | H01M 50/449 429/145 |
| 2014/0255754 A1 | 9/2014 | Nishikawa et al. | |
| 2014/0272505 A1 | 9/2014 | Yoon et al. | |
| 2015/0380707 A1 | 12/2015 | Iwai et al. | |
| 2018/0047962 A1 | 2/2018 | Honda | |

FOREIGN PATENT DOCUMENTS

| | | |
|---|---|---|
| JP | 2006-073221 A | 3/2006 |
| JP | 2010-123383 A | 6/2010 |
| JP | 2011-075714 A | 4/2011 |
| JP | 4988972 B1 | 8/2012 |
| JP | 5282179 B1 | 9/2013 |
| JP | 2004-356102 A | 12/2014 |
| JP | 5664138 B2 | 2/2015 |
| JP | 5876616 B1 | 3/2016 |
| WO | 2005/049318 A1 | 6/2005 |
| WO | 2012/137376 A1 | 10/2012 |
| WO | 2014/136838 A1 | 9/2014 |
| WO | 2015/156127 A1 | 10/2015 |

OTHER PUBLICATIONS

International Search Report for PCT/JP2016/059011, dated Jun. 21, 2016.

Notice of Reason for Rejection for corresponding JP 2016-551871, dated Oct. 11, 2016.

Notice of Reason for Rejection for corresponding JP 2017-024858, dated Mar. 14, 2017.

Raghavan Prasanth et al., "Effect of nano-clay on ionic conductivity and electrochemical properties of poly(vinylidene fluoride) based nanocomposite porous polymer membranes and their application as polymer electrolyte in lithium ion batteries", European Polymer Journal, 2013, pp. 307-318, 49.

Young-Jin Kim et al., "Characteristics of electrospun PVDF/SiO$_2$ composite nanofiber membranes as polymer electrolyte", Materials Chemistry and Physics, 2011, pp. 137-142, 127.

Zhaoliang Cui et al., "Recent progress in fluoropolymers for membranes", Progress in Polymer Science, 2014, pp. 164-198, 39.

* cited by examiner

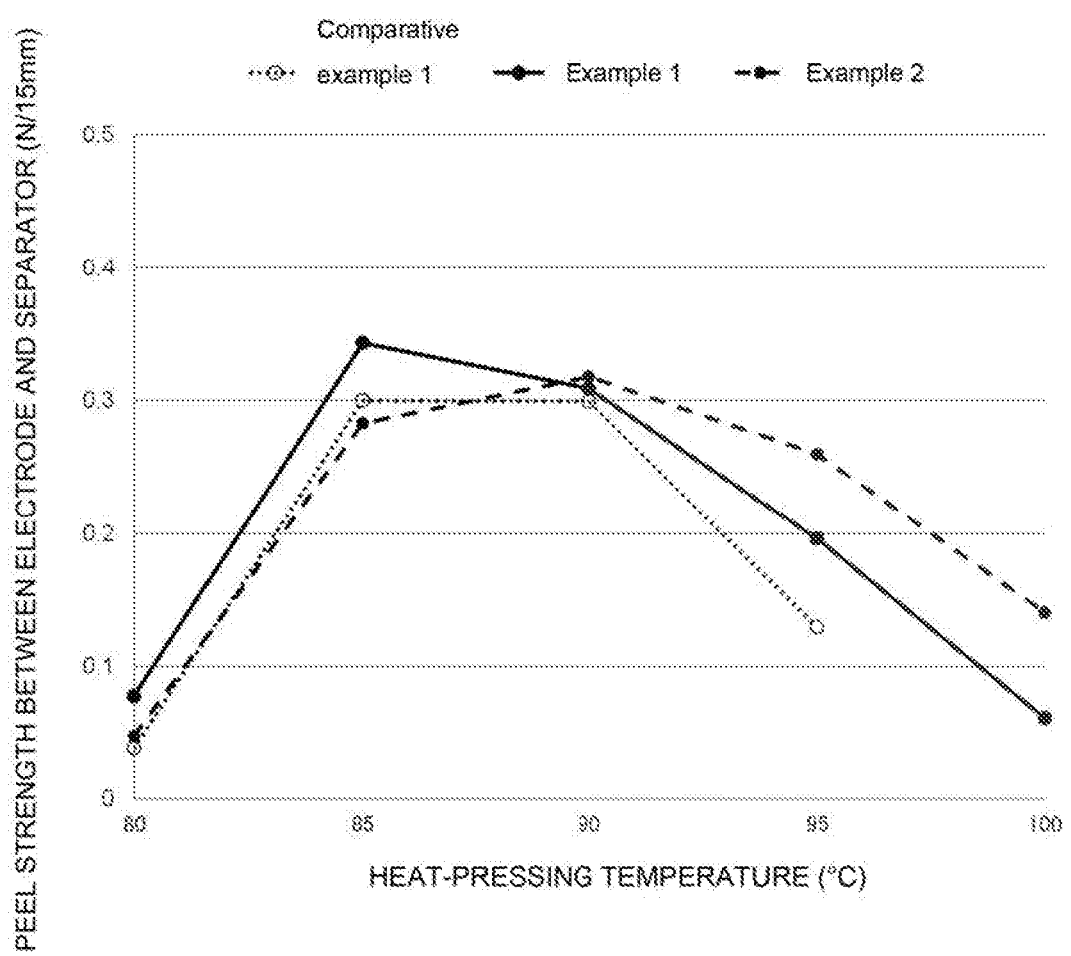

SEPARATOR FOR A NON-AQUEOUS SECONDARY BATTERY, AND NON-AQUEOUS SECONDARY BATTERY

CROSS REFERENCE TO RELATED APPLICATIONS

This application is a continuation of application Ser. No. 15/552,847 filed Aug. 23, 2017, now abandoned, which is a National Stage of International Application No. PCT/JP2016/059011 filed Mar. 22, 2016 (claiming priority based on Japanese Patent Application No. 2015-061570 filed Mar. 24, 2015 and Japanese Patent Application No. 2015-111461 filed Jun. 1, 2015), the contents of which are incorporated herein by reference in their entirety.

TECHNICAL FIELD

The present invention relates to a separator for a non-aqueous secondary battery and a non-aqueous secondary battery.

BACKGROUND ART

Non-aqueous secondary batteries, which are represented by lithium ion secondary batteries, are widely spread as power sources for portable electronic devices such as notebook-size personal computers, mobile phones, digital cameras and camcorders.

In recent years, outer packages of non-aqueous secondary batteries have been simplified and lightened with size reduction and weight reduction of portable electronic devices. As outer packaging materials, aluminum cans have been developed in place of stainless cans, and further, aluminum laminated film packages have been developed in place of metallic cans.

However, an aluminum laminated film package is soft, and therefore in a battery having the package as an outer packaging (soft package battery), a gap is easily formed between an electrode and a separator due to external impact, or electrode expansion and shrinkage associated with charge-discharge, as a result of which the cycle life may be reduced.

Techniques for improving adhesion between an electrode and a separator have been proposed in view of solving the above-mentioned problem. As one of the techniques, a separator in which a porous layer containing a polyvinylidene fluoride-based resin is formed on a polyolefin microporous film is known (see, for example, Patent Literatures 1 to 5). When superimposed on an electrode and heat-pressed, the separator is favorably bound to the electrode with the porous layer interposed therebetween, so that the cycle life of a battery can be improved.

However, since a polyvinylidene fluoride-based resin is an easily chargeable resin, a separator having a porous layer containing a polyvinylidene fluoride-based resin is liable to electrostatically adsorb foreign substances such as dust, and the handling property may be inferior. In order to solve this problem, for example, a technique of applying a surfactant to a porous layer containing a polyvinylidene fluoride-based resin has been proposed (see, for example, Patent Literature 5).

In addition, a technique using a clay mineral for a separator has been proposed. For example, a porous film containing a polyvinylidene fluoride-based resin and a clay mineral has been proposed, and ion conductivity of such a film is known to be improved (see, for example, Non Patent Literature 1). A separator having a surface layer containing a heat resistant resin, ceramics and a clay mineral modified with an organic modifier on a base material composed of a porous film has been proposed, and the shrinkage resistance of such a separator is improved (see, for example, Patent Literature 6).

PATENT LITERATURE

Patent Literature 1: Japanese Patent Application Laid-Open (JP-A) No. 2004-356102
Patent Literature 2: International Publication No. WO 2005/049318
Patent Literature 3: Japanese Patent No. 4988972
Patent Literature 4: Japanese Patent No. 5282179
Patent Literature 5: Japanese Patent Application Laid-Open (JP-A) No. 2006-073221
Patent Literature 6: Japanese Patent No. 5664138
Non-Patent Literature 1: European Polymer Journal, 2013, 49, 307-318

SUMMARY OF INVENTION

Technical Problem

A separator having an adhesive porous layer containing a polyvinylidene fluoride-based resin is adhered well to an electrode by heat-pressing over the electrode. From a viewpoint of improving the battery performance, it is desirable that the electrode and the separator are strongly adhered, whereas the strength of adhesion between the electrode and the separator changes depending on the temperature of the heat-pressing. In a conventional separator provided with an adhesive porous layer containing a polyvinylidene fluoride-based resin, the temperature range of heat-pressing capable of realizing sufficient adhesiveness between an electrode and the separator is not so wide.

Embodiments of the present invention have been made under the above-described circumstances.

An embodiment of the present invention aims to provide a separator for a non-aqueous secondary battery having an adhesive porous layer containing a polyvinylidene fluoride-based resin and having a wide temperature range within which sufficient adhesion between an electrode and the separator can be achieved by heat-pressing, and the present invention aims to solve this problem.

Solution to Problem

Specific means for solving the object described above include the following embodiments.

[1] A separator for a non-aqueous secondary battery, the separator comprising:
a porous substrate; and
an adhesive porous layer provided on one or both sides of the porous substrate and comprising a polyvinylidene fluoride-based resin,
the adhesive porous layer would exhibit a ratio of an area intensity of a β-phase-crystal-derived peak of the polyvinylidene fluoride-based resin to a SUM of an area intensity of an α-phase-crystal-derived peak of the polyvinylidene fluoride-based resin and the area intensity of the β-phase-crystal-derived peak of the polyvinylidene fluoride-based resin of from 10% to 100% when an x-ray diffraction spectrum is obtained by performing measurement by an x-ray diffraction method.

[2] The separator for a non-aqueous secondary battery according to [1], wherein the adhesive porous layer would exhibit the ratio of the area intensity of the β-phase-crystal-derived peak of the polyvinylidene fluoride-based resin to the sum of the area intensity of the α-phase-crystal-derived peak of the polyvinylidene fluoride-based resin and the area intensity of the β-phase-crystal-derived peak of the polyvinylidene fluoride-based resin is from 10% to 35% when the x-ray diffraction spectrum is obtained h performing measurement h the x-ray diffraction method.

[3] The separator for a non-aqueous secondary battery according to [1] or [2], wherein the adhesive porous layer would exhibit a half-width of an endothermic peak of from 15° C. to 30° C. when a differential scanning calorimetry curve is obtained by differential scanning calorimetry.

[4] The separator for a non-aqueous secondary battery according to any one of [1] to [3], wherein the adhesive porous layer further comprises a crystal form regulator.

[5] The separator for a non-aqueous secondary battery according to [4], wherein the crystal form regulator is a layered clay mineral.

[6] The separator for a non-aqueous secondary battery according to [5], wherein the layered clay mineral comprises at least one selected from the group consisting of hectorite, saponite, stevensite, beidellite, montmorillonite, and swellable mica.

[7] The separator for a non-aqueous secondary battery according to [5] or [6], wherein the layered clay mineral has been treated with an intercalating agent.

[8] The separator for a non-aqueous secondary battery according to any one of [5] to [7], w wherein the layered clay mineral comprises an organic onium ion between layers of the layered clay minerals.

[9] The separator for a non-aqueous secondary battery according to any one of [5] to [8], wherein a mass ratio of the polyvinylidene fluoride-based resin to the layered clay mineral contained in the adhesive porous layer is from 99.9:0.1 to 95.0:5.0.

[10] The separator for a non-aqueous secondary battery according to any one of [1] to [9], wherein a weight of the adhesive porous layer on one side of the porous substrate is from 0.5 g/m$^2$ to 2.0 g/m$^2$.

[11] The separator for a non-aqueous secondary battery according to any one of [1] to [10], wherein a peel strength between the porous substrate and the adhesive porous layer is from 0.20 N/12 mm to 1.20 N/12 mm.

[12] The separator for a non-aqueous secondary battery according to any one of [1] to [11], wherein a value obtained by subtracting a Gurley value of the porous substrate from a Gurley value of the separator for a non-aqueous secondary battery is 90 seconds/100 cc or less.

[13] The separator for a non-aqueous secondary battery according to any one of [1] to [12], wherein:
the adhesive porous layer further comprises at least one kind of particles selected from the group consisting of metal hydroxide particles and metal oxide particles; and
a content of the particles in the adhesive porous layer is 10% by mass or more but less than 80% by mass with respect to a total amount of the polyvinylidene fluoride-based resin and the particles.

[14] A separator for a non-aqueous secondary battery, the separator comprising:
a porous substrate; and
an adhesive porous layer provided on one or both sides of the porous substrate and comprising a polyvinylidene fluoride-based resin and a layered clay mineral,
a weight of the adhesive porous layer on one side of the porous substrate being from 0.5 g/m$^2$ to 2.0 g/m$^2$.

[15] A non-aqueous secondary battery comprising:
a positive electrode;
a negative electrode; and
the separator for a non-aqueous secondary battery according to any one of 11 to [14], which is disposed between the positive electrode and the negative electrode,
the non-aqueous secondary battery being configured to produce an electromotive force by lithium doping/de-doping.

Effect of Invention

According to the invention, a separator for a non-aqueous secondary battery having an adhesive porous layer containing a polyvinylidene fluoride-based resin and having a wide temperature range within which sufficient adhesion between an electrode and the separator can be achieved by heat-pressing is provided.

BRIEF DESCRIPTION OF DRAWINGS

FIG. 1 is a graph showing a relationship between a peel strength between an electrode and a separator and a heat-pressing temperature.

DESCRIPTION OF EMBODIMENTS

Hereinafter, an embodiment of the invention will be described. The descriptions and examples are intended to illustrate the invention, and are not intended to limit the scope of the invention.

The value range shown using the expression "from . . . to . . . " in this specification is a range including values described before and after the term "to" as a minimum value and a maximum value, respectively.

In this specification, the term "step" refers not only to an independent step, but also to a step that cannot be clearly distinguished from other steps as long as an expected action of the step is achieved.

In the case of referring to an amount of a certain component in a composition, in a case in which plural substances corresponding to the component are present in the composition, the amount of the component means a total amount of the plural substances which are present in the composition, unless otherwise specified.

In this specification, the "machine direction" means a longitudinal direction of a long separator, and the "transverse direction" means a direction orthogonal to the machine direction of the separator. The "machine direction" is also referred to as a "MD direction", and the "transverse direction" is also referred to as a "TD direction".

<Separator for Non-Aqueous Secondary Battery>

A separator for a non-aqueous secondary battery (also referred to as "separator") of the present disclosure comprises a porous substrate and an adhesive porous layer provided on one side or both sides of the porous substrate and containing a polyvinylidene fluoride-based resin (also referred to as "PVDF resin").

In the separator of the present disclosure, an adhesive porous layer is an outermost layer of the separator and is a layer which adheres to an electrode.

When an X-ray diffraction spectrum of an adhesive porous layer of the separator of the present disclosure is obtained by an X-ray diffraction method, it exhibits a ratio of an area intensity of a β-phase-crystal-derived peak of a PVDF resin to a sum of an area intensity of an α-phase-crystal-derived peak of the PVDF resin and the area intensity of the β-phase-crystal-derived peak of the PVDF resin {=area intensity of β-phase-crystal-derived peak of PVDF resin÷ (area intensity of α-phase-crystal-derived peak of PVDF resin+area intensity of phase-crystal-derived peak of PVDF resin)×100} of from 10% to 100%.

The area intensity of an α-phase-crystal-derived peak of the PVDF resin of the present disclosure is an area intensity of a peak of a (020) plane near 2θ=20° in an X-ray diffraction spectrum obtained by measuring an adhesive porous layer by an X-ray diffraction method. The area intensity of a β-phase-crystal-derived peak of the PVDF resin of the present disclosure is a sum of an area intensity of a peak of a (110) plane and a peak of a (200) plane near 2θ=20.7° in an X-ray diffraction spectrum obtained by measuring an adhesive porous layer by an X-ray diffraction method.

When the area intensity ratio of the β-phase-crystal-derived peak of the PVDF resin in the X-ray diffraction spectrum of the adhesive porous layer is 10% or more, a) the temperature range of heat-pressing capable of realizing adequate adhesion between an electrode and a separator is wide, b) the dielectric constant of the adhesive porous layer increases, promoting dissociation of an electrolyte, and c) the oxidation resistance of the adhesive porous layer is improved. From these viewpoints, the area intensity ratio of the 0-phase-crystal-derived peak of the PVDF resin is more preferably 15% or more, and still more preferably 20% or more. The strength of the adhesion between the electrode and the separator can be evaluated, for example, by the peeling strength between the electrode and the separator. In the separator of the present disclosure, the peeling strength between the electrode and the separator is preferably 0.2 N/15 mm or more.

In the X-ray diffraction spectrum of the adhesive porous layer, when an α-phase-crystal-derived peak of the PVDF resin disappears and a β-phase-crystal-derived peak of the PVDF resin appears, the area intensity ratio of the β-phase-crystal-derived peak of the PVDF resin is 100%. From the above viewpoint, the area intensity ratio of the β-phase-crystal-derived peak of the PVDF resin is preferably 100%, and from a viewpoint of productivity of the adhesive porous layer, the ratio is preferably 90% or less, and more preferably 80% or less.

When a heat-pressing treatment (herein referred to as "dry heat-press") is performed without impregnating a separator with an electrolytic solution, the area intensity ratio of a β-phase-crystal-derived peak of a PVDF resin in the X-ray diffraction spectrum of an adhesive porous layer is preferably 35% or less, more preferably 30% or less, and still more preferably 25% or less from a viewpoint of wide temperature range of heat-pressing capable of realizing adequate adhesion between an electrode and the separator.

The area intensity ratio of a β-phase-crystal-derived peak of a PVDF resin in the X-ray diffraction spectrum of an adhesive porous layer is controlled, for example, by promoting transition of the PVDF resin from the α-phase-crystal to the β-phase-crystal by any one of the following control methods 1) to 6) to form a crystal form in which an α-phase-crystal and a β-phase-crystal coexist in the adhesive porous layer. Among these, the control method 3) is preferable from a viewpoint of the productivity, convenience, and cost reduction.

Control method 1) Use of a copolymer of vinylidene fluoride and a monomer having a bulky group (for example, trifluoroethylene, chlorotrifluoroethylene) as a PVDF resin for molding an adhesive porous layer.

Control method 2) Selection of a solvent of a coating liquid for forming an adhesive porous layer, and adjusting conditions for forming the adhesive porous layer (for example, the composition of the coating liquid, the temperature of the coating liquid, the composition of a coagulating liquid, the temperature of a coagulating liquid, the drying temperature, the presence or absence of heat treatment, and the like).

Control method 3) Addition of crystal form regulator to a coating liquid for molding an adhesive porous layer. Adjusting the size, dispersibility, compounding amount, and the like of the crystal form regulator.

Control method 4) Use of an ionic liquid as a solvent in a coating liquid for molding an adhesive porous layer, and adjusting conditions for crystallizing a PVDF resin (temperature, time, concentration, etc.).

Control method 5) Melting and crystallizing a PVDF resin in an adhesive porous layer when an adhesive porous layer is formed by coextrusion of a porous substrate therewith. Adjusting melting and crystallization conditions (temperature, time, pressure, and the like).

Control method 6) Mechanically stretching a separator provided with an adhesive porous layer. Adjusting the stretching temperature and stretch ratio when stretching the separator.

In the separator of the present disclosure, since the area intensity ratio of a β-phase-crystal-derived peak of a PVDF resin in the X-ray diffraction spectrum of an adhesive porous layer is from 10% to 100%, it is possible to expand the temperature range of the heat-pressing capable of realizing sufficient adhesion between an electrode and the separator. Since the separator of the present disclosure is excellent in adhesion to an electrode, it is possible to enhance the uniformity of an in-battery reaction during charging and discharging of a secondary battery thereby improving the battery performance.

Since the separator of the present disclosure has a wide temperature range of heat-pressing capable of realizing sufficient adhesion between an electrode and the separator, the separator is suitable for a battery (a so-called soft pack battery) using an aluminum laminate film pack as an outer packaging material. By the separator of the present disclosure, formation of a gap between an electrode and the separator, which can be caused by expansion and shrinkage of the electrode accompanying charging and discharging or an impact from the outside, is suppressed, and therefore, the quality stability of a soft pack battery can be improved.

In a differential scanning calorimetry curve (DSC curve) obtained by performing differential scanning calorimetry (DSC) of an adhesive porous layer of the separator of the present disclosure, the half-width of the endothermic peak preferably ranges from 15° C. to 30° C. The endothermic peak is presumed to be an endothermic peak appearing due to melting of a resin contained in the adhesive porous layer.

In the present disclosure, the half-width of an endothermic peak is obtained from a DSC curve obtained by collecting an adhesive porous layer from a separator and performing DSC under a nitrogen atmosphere at a heating rate of 10° C./min. The half-width is a full width at half maximum. The height of an endothermic peak is the height from a baseline connecting a peak start point and a peak end point. When it is difficult to judge the peak start point or the peak end point, a point at which a sudden change starts obtained by differentiating the DSC curve is set as the peak start point or the peak end point. When there are a plurality of endothermic peaks, the half-width of the maximum endothermic peak is preferably from 15° C. to 30° C.

When the half-width of the endothermic peak in the DSC curve of the adhesive porous layer is 15° C. or more, the temperature range of the heating press at the time of adhering the separator and an electrode is wider. From this viewpoint, the half-width of the endothermic peak is more preferably 18° C. or higher, and still more preferably 20° C. or higher. On the other hand, when the half-width of the endothermic peak in the DSC curve of the adhesive porous layer is 30° C. or less, the adhesive porous layer is excellent in resistance to dissolution in an electrolytic solution. From this viewpoint, the half-width of the endothermic peak is more preferably 27° C., or less, and still more preferably 25° C. or less.

The half-width of the endothermic peak in the DSC curve of the adhesive porous layer can be controlled by the crystal form of a PVDF resin. For example, the half-width can be broadened by blending a crystal form regulator in a coating liquid for forming an adhesive porous layer, so that transition from an α-phase-crystal to a β-phase-crystal of the PVDF resin is promoted and thus a crystal form in which an α-phase-crystal and a β-phase-crystal coexist in the adhesive porous layer is formed.

Details of the porous substrate and the adhesive porous layer included in the separator of the present disclosure are explained below.

[Porous Substrate]

In the present disclosure, the term "porous substrate" means a substrate having pores or voids inside. Examples of such a substrate include a microporous membrane; a porous sheet formed of a fibrous material, such as nonwoven fabric or a paper-like sheet; and the like. Particularly from the viewpoints of thinning of a separator and high strength, a microporous membrane is preferable in the present disclosure. The "microporous membrane" means a membrane that has a large number of micropores inside, and has a structure in which these micropores are joined, to allow gas or liquid to pass therethrough from one side to the other side.

The porous substrate preferably contain a thermoplastic resin from the viewpoint of imparting a shutdown function to the porous substrate. The term "shutdown function" refers to the following function. Namely, in a case in which the battery temperature increases, the thermoplastic resin melts and blocks the pores of the porous substrate, thereby blocking migration of ions, to prevent thermal runaway of the battery. As the thermoplastic resin, a resin having a melting temperature of lower than 200° C. is preferable. Examples of the thermoplastic resin include: polyesters such as polyethylene terephthalate; and polyolefins such as polyethylene and polypropylene. Among these, polyolefins are preferable.

As the porous substrate, a microporous membrane (referred to as "polyolefin microporous membrane") including polyolefin is preferable. Examples of the polyolefin microporous membrane include those applied to a conventional separator for a non-aqueous secondary battery, and one that has sufficient mechanical characteristic and ion permeability may be preferably selected therefrom.

From the viewpoint of exhibiting the shutdown function, the polyolefin microporous membrane preferably includes polyethylene, and the content of polyethylene is preferably 95% by mass or larger with respect to a mass of an entire of the polyolefin microporous membrane.

From the viewpoint of imparting heat resistance to such a degree that the membrane does not easily break when exposed to high temperatures, a polyolefin microporous membrane including polyethylene and polypropylene is preferable. An example of such a polyolefin microporous membrane is a microporous membrane in which polyethylene and polypropylene are present as a mixture in one layer. In such a microporous membrane, it is preferable that polyethylene is contained in an amount of 95% by mass or more and polypropylene is contained in an amount of 5% by mass or less, from the viewpoint of achieving both the shutdown function and heat resistance. From the viewpoint of achieving both the shutdown function and heat resistance, a polyolefin microporous membrane having a multi-layer structure of two or more layers, in which at least one layer includes polyethylene and at least one layer includes propylene, is also preferable.

It is preferable that the polyolefin contained in the polyolefin microporous membrane has a weight average molecular weight (Mw) of from 100,000 to 5,000,000. When the weight average molecular weight is 100,000 or more, sufficient mechanical characteristics can be ensured. When the weight average molecular weight is 5,000,000 or less, the shutdown characteristics are favorable, and it is easy to form a membrane.

The polyolefin microporous membrane can be manufactured, for example, by the following method. Namely, the polyolefin microporous membrane can be manufactured by a method in which a molten polyolefin resin is extruded through a T-die to form a sheet, the sheet is subjected to a crystallization treatment, followed by stretching, and further is subjected to a heat treatment, thereby obtaining a microporous membrane. Alternatively, the polyolefin microporous membrane can be manufactured by a method in which a polyolefin resin melted together with a plasticizer such as liquid paraffin is extruded through a I-die, followed by cooling, to form a sheet, the sheet is stretched, the plasticizer is extracted from the sheet, and the sheet is subjected to a heat treatment, thereby obtaining a microporous membrane.

Examples of the porous sheet formed of a fibrous material include a porous sheet formed of a nonwoven fabric formed of fibrous material of a thermoplastic resin, a paper, or the like.

For the purpose of improving wettability with a coating liquid for forming a porous layer, the surface of the porous substrate may be subjected to a surface treatment selected from various ones as long as it does not impair characteristics of the porous substrate. Examples of the surface treatment include a corona treatment, a plasma treatment, a flame treatment, and an ultraviolet irradiation treatment.

[Property of Porous Substrate]

From the viewpoint of obtaining favorable mechanical characteristics and internal resistance, a thickness of the porous substrate is preferably from 3 μm to 25 μm, and more preferably from 5 μm to 20 μm.

From the viewpoints of preventing a short circuit in a battery and obtaining sufficient ion permeability, a Gurley value (HS P8117(2009)) of the porous substrate is preferably from 50 sec/100 cc to 800 sec/100 cc, more preferably from 50 sec/100 cc to 400 sec/100 cc, and still more preferably from 50 sec/100 cc to 250 sec/100 cc.

From the viewpoint of obtaining appropriate film resistance and exhibiting the shutdown function, the porous substrate has a porosity of from 20% to 60%. The porosity of the porous substrate is determined by the following calculation method. That is, setting the constituent materials to a, b, c, . . . , n, the weights of the constituent materials to Wa, Wb, Wc, . . . , Wn (g/cm$^2$), the true densities of the constituent materials da, db, dc, . . . , dn (g/cm$^3$), and the film thickness of a layer of interest to t (cm), the porosity ε (%) is determined by the following formula.

$$\varepsilon = \{1-(Wa/da+Wb/db+Wc/dc+ \ldots +Wn/dn)/t\} \times 100$$

From the viewpoint of improving a production yield, a piercing strength of the porous substrate is preferably 200 g or more. The piercing strength of the porous substrate refers to a maximum piercing load (g) measured by a piercing test which uses a handy compression tester KES-G5 available from Katotech Co., Ltd., with conditions of a needle having a tip with a radius of curvature of 0.5 mm and a piercing rate of 2 mm/sec.

[Adhesive Porous Layer]

In the present disclosure, the adhesive porous layer is provided on one side or both sides of a porous substrate, and is a porous layer containing at least a PVDF resin. In the present disclosure, the adhesive porous layer may further contain another resin that is other than the PVDF resin, or other components such as a filler.

In the present disclosure, the adhesive porous layer has a large number of fine pores inside, and has a structure in which these fine pores are connected, so that gas or liquid can pass from one side to the other side.

In the present disclosure, the adhesive porous layer is provided, as an outermost layer of a separator on one side or both sides of a porous substrate, and is a layer which adheres to an electrode when the separator and the electrode are layered and subject to pressing or heat-pressing.

The adhesive porous layer is preferably on both sides rather than on only one side of the porous substrate from a viewpoint of superior cycle characteristics (capacity retention rate) of a battery. This is because when an adhesive porous layer is on both sides of a porous substrate, both sides of a separator adhere well to both electrodes via the adhesive porous layer

[Polyvinylidene Fluoride-Based Resin]

The separator of the present disclosure is excellent in adhesion to an electrode as the separator has the adhesive porous layer, which includes a PVDF resin, at its outermost later.

Examples of the PVDF resin contained in the adhesive porous layer include a homopolymer of vinylidene fluoride (i.e. polyvinylidene fluoride); a copolymer of vinylidene fluoride and other copolymerizable monomer (polyvinylidene fluoride copolymers); and mixtures thereof. Examples of the monomer polymerizable with vinylidene fluoride include tetrafluoroethylene, hexafluoropropylene, trifluoroethylene, chlorotrifluoroethylene, vinyl fluoride and trichloroethylene, one of which or two or more of which may be employed.

From the viewpoint of adherence to an electrode, the PVDF resin is preferably a copolymer in Which vinylidene fluoride and at least hexafluoropropylene are copolymerized. When the PVDF resin is prepared by copolymerizing hexafluoropropylene with vinylidene fluoride, crystallinity and heat resistance of the polyvinylidene fluoride-based resin can be regulated to fall within a proper range, as a result of which it becomes possible to inhibit flowing of the adhesive porous layer during a process of bonding of the porous layer to the electrode. A proportion of constituent units derived from hexafluoropropylene in the copolymer is preferably from 0.1 mol % to 10 mol % (and preferably from 0.5 mol % to 8 mol %).

From a viewpoint of controlling the area intensity ratio of the β-phase-crystal-derived peak, as the PVDF resin, a copolymer of vinylidene fluoride and a monomer having a bulky group (for example, trifluoroethylene or chlorotrifluoroethylene) is preferably used.

The PVDF resin preferably has a weight average molecular weight (Mw) of from 300,000 to 3,000,000. When the Mw of the PVDF resin is 300,000 or more, mechanical properties by which an adhesive porous layer can withstand an adhesion treatment with an electrode can be ensured, and sufficient adhesiveness can be obtained. From this viewpoint, the Mw of the PVDF resin is preferably 500,000 or more, more preferably 800,000 or more, and still more preferably 1,000,000 or more. On the other hand, when the Mw of the PVDF resin is 3,000,000 or less, the viscosity of a coating liquid for coating and molding an adhesive porous layer does not become too high, and the moldability and crystal formation are favorable, whereby the adhesive porous layer is favorably made porous. From this viewpoint, the Mw of the PVDF resin is more preferably equal to or less than 2,500,000, and still more preferably equal to or less than 2,000,000.

Examples of a method of manufacturing the PVDF resin include emulsion polymerization and suspension polymerization. A commercially available PVDF resin can also be used.

A content of the PVDF resin contained in the adhesive porous layer based on a total amount of all the resins contained in the adhesive porous layer is preferably 95% by mass or more, more preferably 97% by mass or more, still more preferably 98% by mass or more, still more preferably 99% by mass or more, and particularly preferably 100% by mass.

[Resins Other than PVDF Resin]

In the present disclosure, the adhesive porous layer may contain a resin other than the PVDF resin.

Examples of the resin other than the PVDF resin include acrylic resins, fluorine-containing rubbers, styrene-butadiene copolymers, homopolymers or copolymers of vinylnitrile compounds (such as acrylonitrile, or methacrylonitrile), carboxymethyl cellulose, hydroxyalkyl cellulose, polyvinyl alcohol, polyvinyl butyral, polyvinyl pyrrolidone, and polyethers (such as polyethylene oxide or polypropylene oxide).

Examples of the acrylic resin include a polymer obtained by homopolymerizing or copolymerizing an acrylic acid ester such as methyl acrylate, ethyl acrylate, isopropyl acrylate, n-butyl acrylate, 2-ethylhexyl acrylate, 2-hydroxyethyl acrylate or hydroxypropyl acrylate; a polymer obtained by homopolymerizing or copolymerizing a methacrylic acid ester such as methyl methacrylate, ethyl methacrylate, isopropyl methacrylate, butyl methacrylate, isobutyl methacrylate, n-hexyl methacrylate; cyclohexyl methacrylate, lauryl methacrylate, hydroxyethyl methacrylate, hydroxypropyl methacrylate, or diethyl aminoethyl methacrylate; a copolymer of at least one acrylate ester and at least one methacrylate ester; and a copolymer obtained by copolymerizing at least one selected from acrylic acid ester and methacrylic acid ester with at least one selected from acrylic acid, methacrylic acid, acrylamide, N-methylol acrylamide, diacetone acrylamide and the like. Among them, polymethyl methacrylate (PMMA) is preferable as the acrylic resin. PMMA may be a polymer obtained by homopolymerizing methyl methacrylate or a copolymer obtained by copolymerizing a monomer other than methyl methacrylate. Such other monomer to be copolymerized is preferably at least one selected from methyl acrylate, an acrylic acid, and a methacrylic acid.

A weight average molecular weight (Mw) of the acrylic resin is preferably from 300,000 to 3,000,000. When the Mw of the acrylic resin is 300,000 or more, the mechanical properties of an adhesive porous layer are more excellent and the adhesive property to an electrode is excellent. On the other hand, when the Mw of the acrylic resin is 3,000; 000 or less, the viscosity of a coating liquid for coating and molding an adhesive porous layer does not become too high, the moldability and crystal formation are favorable, whereby the adhesive porous layer is favorably made porous. The weight average molecular weight of the acrylic resin is more preferably from 300,000 to 2,000,000.

[Crystal Form Regulator]

In the present disclosure, the adhesive porous layer preferably contains a crystal form regulator from a viewpoint of controlling the crystal form of the PVDF resin and controlling the area intensity ratio of the β-phase-crystal-derived peak. In the present disclosure, the crystal form regulator is a chemical substance capable of controlling the crystal form of the PVDF resin.

Examples of the crystal form regulator include organic fillers and inorganic fillers. The inorganic filler may be surface-modified with a silane coupling agent or the like. One type of the crystal form regulator may be used alone, or two or more types of the crystal form regulator may be used in combination. As the crystal form regulator, an organic filler or an inorganic filler having a large aspect ratio is preferable. For example, a carbon nanotube or a layered clay mineral is preferable, and a layered clay mineral is more preferable. The aspect ratio of the crystal form regulator is preferably from 5 to 1,000, and more preferably from 10 to 500.

[Layered Clay Mineral]

One example of the crystal form regulator is a clay mineral which is an inorganic compound having a layered structure, a so-called layered clay mineral. In the present disclosure, the adhesive porous layer preferably contains a layered clay mineral from a viewpoint of controlling the crystal form of the PVDF resin and controlling the area intensity ratio of the β-phase-crystal-derived peak.

From a viewpoint of the handling property of the separator, the separator of the present disclosure preferably includes a layered clay mineral in the adhesive porous layer. Since the PVDF resin contained in the adhesive porous layer is easily charged, foreign matters are easily electrostatically adsorbed, and the handling property of the separator may be impaired. However, when a layered clay mineral is contained in the PVDF resin, charging of the adhesive porous layer is suppressed, whereby the handling property of the separator becomes excellent.

Examples of the layered clay mineral include layered silicate (Si—Al-based, Si—Mg-based, Si—Al—Mg-based, Si—Ca-based or the like). The layered clay mineral contained in the adhesive porous layer may be in a single layer state or in a multilayer state.

The layered clay mineral preferably has a cation exchange ability and further exhibits a property of swelling by incorporating water between layers, and preferred examples thereof include smectite clay mineral and swelling mica.

Examples of the smectite clay mineral include hectorite, saponite, stevensite, beidellite, montmorillonite (these may be natural or chemically synthesized), and substitutes, derivatives, or mixtures thereof. Examples of the swelling mica include synthetic swellable mica which is chemically synthesize and having Li ions or Na ions between layers, and substitutes, derivatives, or mixtures thereof.

As the layered clay mineral, layered clay minerals in which particles of the layered clay mineral are treated with an intercalating agent are preferable. As the intercalating agent, a compound containing an organic onium ion is preferable. By treating the particles of the layered clay mineral with a compound containing an organic onium ion, a cation existing between layers of the layered clay mineral is exchanged with the organic onium ion, and the organic onium ion is held between layers of the layered clay mineral by an ionic bond. Since the layered clay mineral having an organic onium ion between layers (herein, sometimes referred to as "organic onium ion modified layered clay mineral") is excellent in dispersibility in a PVDF resin, it is presumed that: a) the uniformity of the higher order structure of the adhesive porous layer is increased, whereby the adhesion of the adhesive porous layer to an electrode is further strengthened: b) charging of the adhesive porous layer is further suppressed; and c) transition from α-type-crystal to β-type-crystal of the PVDF resin is promoted.

The compound containing an organic onium ion used as the intercalating agent is preferably selected from a salt (so-called quaternary ammonium compound) of a quaternary ammonium ion (that is, a cation) having a chemical structure represented by the following Formula (1) and an anion.

(1)

In Formula (1), $R^1$, $R^2$, $R^3$, and $R^4$ each independently represent an alkyl group having from 1 to 30 carbon atoms or a hydroxypolyoxyethylene group represented by —$(CH_2CH_2O)_n$H (n is an integer of from 1 to 30). $R^1$, $R^2$, $R^3$, and $R^4$ are preferably an alkyl group having from 1 to 30 carbon atoms, and more preferably an alkyl group having from 1 to 18 carbon atoms.

Examples of the quaternary ammonium compound preferable as the intercalating agent include dodecyltrimethylammonium chloride, tetradecyl trimethyl ammonium chloride, hexadecyl trimethyl ammonium chloride, octadecyl trimethyl ammonium chloride, oleyl trimethyl ammonium chloride, didodecyl dimethyl ammonium chloride, ditetradecyl dimethyl ammonium chloride, dihexadecyl dimethyl ammonium chloride, dioctadecyl dimethyl ammonium chloride, dioleyl dimethyl ammonium chloride, dodecyl diethyl benzyl ammonium chloride, tetradecyl dimethyl benzyl ammonium chloride, hexadecyl dimethyl benzyl ammonium chloride, octadecyl dimethyl benzyl ammonium chloride, oleyl dimethyl benzyl chloride, trioctyl methyl ammonium chloride, hydroxypolyoxypropylene methyl diethyl ammonium chloride, hydroxypolyoxyethylene dodecyl dimethyl ammonium chloride, hydroxypolyoxyethylene tetradecyl dimethyl ammonium chloride, hydroxypolyoxyethylene hexadecyl dimethyl ammonium chloride, hydroxypolyoxyethylene octadecyl dimethyl ammonium chloride, hydroxypolyoxyethylene oleyl dimethyl ammonium chloride, dihydroxy, polyoxyethylene dodecyl methyl ammonium chloride, bis(hydroxypolyoxyethylene) tetradecyl methyl ammonium chloride, bis(hydroxypolyoxyethylene) hexadecyl methyl ammonium chloride, bis(hydroxypolyoxyethylene) octadecyl methyl ammonium chloride, and bis(hydroxypolyoxyethylene) oleyl methyl ammonium chloride. Of course, the quaternary ammonium compound used as the intercalating agent is not limited thereto.

Examples of a method of treating a layered clay mineral particle with a compound containing an organic onium ion include a method in which 1 part by mass of layered clay mineral and 1 part by mass to 10 parts by mass of a compound containing an organic onium ion are mixed in water and then the mixture is dried. An amount of the water to be used (on a mass basis) is preferably from 1 time to 100 times the layered clay mineral. A temperature at the time of mixing is preferably from 30° C. to 70° C., and the mixing time is preferably from 0.5 hours to 2 hours. As a means for the drying, a general method such as hot air drying, vacuum drying, freeze drying or the like can be used, although not limited thereto.

Layered clay minerals are generally plate-like particles with a large aspect ratio. The aspect ratio of the layered clay mineral is preferably from 5 to 1,000, more preferably from 10 to 500, from a viewpoint of easily exhibiting a function of controlling the crystal form of a PVDF resin. A major axis length of the layered clay mineral is preferably 1.0 µm or less, more preferably 0.5 µm or less, and still more preferably 0.3 µm or less.

An average layer thickness of the layered clay mineral contained in the adhesive porous layer is preferably 500 nm or less, more preferably 200 nm or less, and still more preferably 150 nm or less. When the average layer thickness of the layered clay mineral is 500 nm or less, the non-uniformity of the porous structure of the adhesive porous layer is suppressed, whereby the load characteristics of a secondary battery are further improved.

The average layer thickness of the layered clay mineral contained in the adhesive porous layer means an average value of the layer thicknesses of 20 arbitrarily selected layered clay minerals measured by observing a cross section of the adhesive porous layer with an electron microscope. The average layer thickness of the layered clay mineral contained in the adhesive porous layer can be controlled by a particle diameter and an addition amount of the layered clay mineral used for preparation of a coating liquid.

A mass ratio of the PVDF resin to the layered clay mineral contained in the adhesive porous layer is preferably from 99.9:0.1 to 90.0:10.0. From a viewpoint of controlling the crystal form of the PVDF resin and suppressing the charging of the adhesive porous layer, the mass ratio of the layered day mineral is preferably 0.1 or more, more preferably 0.2 or more, more preferably 0.5 or more, and still more preferably 1.0 or more. From a viewpoint of the peel strength between the porous substrate and the adhesive porous layer and suppressing the water content of the separator, the mass ratio of the layered clay mineral is preferably 10.0 or less, more preferably 5.0 or less, still more preferably 4.0 or less, and still more preferably 3.0 or less.

Therefore, the mass ratio of the PVDF resin to the layered clay mineral contained in the adhesive porous layer is preferably from 99.9:0.1 to 90.0:10.0, more preferably from 99.9:0.1 to 95.0:5.0, still more preferably from 99.8:0.2 to 95.0:5.0, still more preferably from 99.8:0.2 to 96.0:4.0, still more preferably from 99.5:0.5 to 96.0:4.0, still more preferably from 99.0:1.0 to 96.0:4.0, and still more preferably from 99.0:1.0 to 97.0:3.0.

One embodiment of the separator of the present disclosure includes a porous substrate and an adhesive porous layer including the PVDF resin and the layered clay mineral provided on one side or both sides of the porous substrate, and a weight of the adhesive porous layer is 0.5 g/m$^2$ to 2.0 g/m$^2$ on one side of the porous substrate. This embodiment is excellent in adhesion to an electrode and excellent in handling property.

[Other Additives]

In the present disclosure, the adhesive porous layer may contain a filler made of an inorganic material or an organic material and other additives for the purpose of improving the slipping property and heat resistance of a separator. In such a case, it is preferable to set a content and a particle size thereof to such an extent that those do not inhibit the effect of the present disclosure.

The filler content is preferably less than 80% by mass based on a total amount of the PVDF resin and the filler, and when the content is less than 80% by mass, the adhesion of the adhesive porous layer to an electrode is improved and the battery performance is improved. From the above viewpoint, the filler content is more preferably 70% by mass or less, more preferably 65% by mass or less, still more preferably 60% by mass or less, based on the total amount of the PVDF resin and the filler. When a filler is contained in the adhesive porous layer, the filler content is preferably 10% by mass or more, more preferably 20% by mass or more, still more preferably 30% by mass or more, based on the total amount of the PVDF resin and the filler.

An average particle size of the filler is preferably from 0.01 µm to 10 µm. The lower limit value thereof is more preferably 0.1 µm or more, and the upper limit value thereof is more preferably 5 µm or less.

A particle size distribution of the filler is preferably 0.1 µm<d90−d10<3 µm. Here, d10 represents a particle diameter (µm) of cumulative 10%, and d90 represents a particle diameter (µm) of cumulative 90%, in the weight cumulative particle size distribution calculated from the small particle side. For measurement of the particle size distribution, for example, a laser diffraction type particle size distribution measuring apparatus (MASTERSIZER 2000 manufactured by Sysmex Corporation) is used, water is used as a dispersion medium, and a trace amount of nonionic surfactant TRITON X-100 is used as a dispersant.

[Inorganic Filler]

The inorganic filler in the present disclosure is preferably one that is stable with respect to an electrolytic solution and is electrochemically stable.

Examples of the inorganic filler include: a particle of a metal hydroxide such as aluminum hydroxide, magnesium hydroxide, calcium hydroxide, chromium hydroxide, zirconium hydroxide, cerium hydroxide, nickel hydroxide or boron hydroxide; a metal oxide such as silica, alumina, zirconia or magnesium oxide; a carbonate such as calcium carbonate or magnesium carbonate; and a sulfate such as barium sulfate or calcium sulfate. The inorganic filler preferably includes at least one of a metal hydroxide particle or a metal oxide particle, and from the viewpoint of impartment of flame retardancy and an electricity eliminating effect, the inorganic filler more preferably includes a metal hydroxide particle, and particularly preferably includes a magnesium hydroxide particle. The inorganic filler may be one that is surface-modified with a silane coupling agent.

A particle shape of the filler is not limited, and may be any of a spherical-like shape or a plate-like shape. The filler is preferably in the form of plate-like shaped particles, or in the form of non-aggregated primary particles from the viewpoint of inhibiting a short-circuit of the battery.

When an inorganic filler (preferably at least one selected front metal hydroxide particles and metal oxide particles, more preferably at least one metal hydroxide particle) is contained in an adhesive porous layer, the inorganic tiller content is, with respect to the total amount of PVDF resin and the inorganic filler, preferably 10% by mass or more, more preferably 20% by mass or more, still more preferably 30% by mass or more, and preferably less than 80% by mass, more preferably 70% by mass or less, still more preferably 65% by mass or less, and still more preferably 60% by mass or less.

[Organic Filler]

Examples of an organic filler in the present disclosure include cross-linked acrylic resins such as cross-linked polymethylmethacrylate, cross-linked polystyrene, and cross-linked polymethylmethacrylate is preferable.

The adhesive porous layer in the present disclosure may contain an additive such as a dispersant like a surfactant, a wetting agent, a defoaming agent, or a pH adjusting agent. The dispersant is added to a coating liquid for forming the adhesive porous layer for the purpose of improving dispersibility, coating property, and storage stability. The wetting agent, the defoaming agent, and the pH adjusting agent are added to a coating liquid for forming an adhesive porous layer for the purposes of, for example, improvement of compatibility with the porous substrate, suppression of air biting into the coating liquid, or pH adjustment.

[Characteristics of Adhesive Porous Layer]

In the present disclosure, a weight of the adhesive porous layer is preferably from 0.5 g/m$^2$ to 2.0 g/m$^2$ on one side of the porous substrate from a viewpoint of load characteristics of a battery. When the weight is 0.5 g/m$^2$ or more on one side of the porous substrate, adhesion between the separator and an electrode is favorable, and the load characteristics of the battery is excellent. On the other hand, when the weight is 2.0 g/m$^2$ or less on one side of the porous substrate, the ion permeability of the separator is excellent and the load characteristics of the battery is excellent.

From the above viewpoint, the weight of the adhesive porous layer is more preferably from 0.75 g/m$^2$ to 2.0 g/m$^2$ on one side of the porous substrate, and more preferably from 1.0 g/m$^2$ to 2.0 g/m$^2$. The weight of the adhesive porous layer is, as a total of both sides of the porous substrate, preferably from 1.0 g/m$^2$ to 4.0 g/m$^2$, more preferably from 1.5 g/m$^2$ to 4.0 g/m$^2$, and still more preferably from 2.0 g/m$^2$ to 4.0 g/m$^2$.

When the adhesive porous layer is provided on both sides of the porous substrate, the difference in weight between the weight of the adhesive porous layer on one side and the weight of the adhesive porous layer on the other side is preferably 20% by mass or less with respect to the total weight of the adhesive porous layer on both sides. When the weight difference is 20% by mass or less, a separator hardly curls, and therefore, the handling property is further improved.

The thickness of the adhesive porous layer is preferably from 0.5 μm to 4 μm on one side of the porous substrate. When the thickness is 0.5 μm or more, adhesion to an electrode becomes favorable, which is preferable from the viewpoint of improving cycle characteristics of a battery. From this viewpoint, the thickness of the adhesive porous layer is more preferably 1 μm or more on one side of the porous substrate. On the other hand, when the thickness is 4 μm or less, since the ion permeability of the separator is favorable, load characteristics of a battery is excellent, and the coefficient of thermal expansion in the width direction of the separator can be easily controlled to be within the range of from more than 0% to 10%. From these viewpoints, the thickness of the adhesive porous layer is more preferably 3 μm or less, and still more preferably 2.5 μm or less, on one side of the porous substrate.

In the present disclosure, the adhesive porous layer preferably has a sufficiently porous structure from a viewpoint of ion permeability. Specifically, the porosity is preferably from 30% to 80%. When the porosity is 80% or less, mechanical properties capable of withstanding a pressing step for adhering to an electrode can be secured, and the surface opening ratio is not too high, which is suitable for securing sufficiently strong adhesion. On the other hand, the porosity of 30% or more is preferable from a viewpoint of improving ion permeability. A method of determining the porosity of the adhesive porous layer in the present disclosure is the same as the method of determining the porosity of the porous substrate.

The adhesive porous layer preferably has an average pore diameter of from 10 nm to 200 nm. The average pore diameter of 200 nm or less is preferable from viewpoints that non-uniformity of pores is suppressed, adhesion points are uniformly scattered, and adhesion to an electrode is further improved. The average pore diameter of 200 nm or less is preferable from the viewpoint of high uniformity of movement of ions and further improvement of cycle characteristics and load characteristics. On the other hand, in a case in which the average pore diameter is 10 nm or more, when the adhesive porous layer is impregnated with the electrolytic solution, a resin which forms the adhesive porous layer less likely inhibits the ion permeability by swelling and thereby blocking pores.

In the present disclosure, the average pore diameter (nm) of the adhesive porous layer is calculated by the following Equality, assuming that all the pores are cylindrical.

$$d=4V/S$$

In the Equality, d represents the average pore diameter (diameter) of the adhesive porous layer, V represents a pore volume per 1 m$^2$ of the adhesive porous layer, and S represents a pore surface area per 1 m$^2$ of the adhesive porous layer.

The pore Volume V per 1 m$^2$ of the adhesive porous layer is calculated from the porosity of the adhesive porous layer. The pore surface area S of the pores per 1 m$^2$ of the adhesive porous layer is obtained by a method as set forth below.

First, a specific surface area (m$^2$/g) of a porous substrate and the specific surface area m$^2$/g) of the separator are calculated from a nitrogen gas adsorption amount by applying the BET equation to the nitrogen gas adsorption method. The specific surface areas (m$^2$/g) are multiplied by each basis weight (g/m$^2$) to calculate the pore surface areas per 1 m$^2$ respectively. Then, the pore surface area per 1 m$^2$ of the porous base material is subtracted from the pore surface area per 1 m$^2$ of the separator to calculate the pore surface area S per 1 m$^2$ of the adhesive porous layer.

[Characteristics of Separator for Non-Aqueous Secondary Battery]

A thickness of the separator of the present disclosure is preferably 30 μm or less, and more preferably 25 μm or less from a viewpoint of energy density and output characteristics of a battery. The thickness of the separator of the present disclosure is preferably 5 μm or more, and more preferably 10 μm or more from a viewpoint of mechanical strength.

A puncture strength of the separator of the present disclosure is preferably from 250 g to 1000 g, and more preferably from 300 g to 600 g. A method of measuring the puncture strength of the separator is the same as the method of measuring the puncture strength of the porous substrate.

A porosity of the separator of the present disclosure is preferably from 30% to 60% from viewpoints of adhesion to the electrode, handling property, ion permeability, and mechanical properties. A method of determining the porosity of the separator in the present disclosure is the same as the method of obtaining the porosity of the porous substrate.

From the viewpoint of good balance between mechanical strength and film resistance, the Gurley value (JIS P8117: 2009) of the separator of the present disclosure is preferably from 50 sec/100 cc to 800 sec/100 cc, more preferably from 50 sec/100 cc to 400 sec/100 cc, and still more preferably from 100 sec/100 cc to 300 sec/100 cc.

In the separator of the present disclosure, from a viewpoint of ion permeability, a value obtained by subtracting the Gurley value of the porous substrate from the Gurley value of the separator (in a state in which the adhesive porous layer is formed on the porous substrate) is preferably 90 sec/100 cc or less, more preferably 80 sec/100 cc or less, and still more preferably 70 sec/100 cc or less. When the value is 90 seconds/100 cc or less, the adhesive porous layer does not become too dense, ion permeability is favorably maintained, and excellent battery characteristics are obtained. A lower limit of the value is not particularly limited and is 0 sec/100 cc or more.

In the present disclosure, a peeling strength between the adhesive porous layer and the porous substrate is preferably from 0.20 N/12 mm to 1.20 N/12 mm from viewpoints of adhesion to the electrode and ion permeability. When the peel strength is 0.20 N/12 mm or more, adhesion between the adhesive porous layer and the porous substrate is excellent, and as a result, the adhesion between the electrode and the separator is improved. From this viewpoint, the peeling strength is preferably 0.20 N/12 mm or more, and more preferably 0.25 N/12 mm or more. When the peeling strength is 1.20 N/12 mm or less, the ion permeability of a separator is excellent. From this viewpoint, the peeling strength is preferably 1.20 N/12 mm or less, more preferably 1.10 N/12 mm or less, still more preferably 1.00 N/12 mm or less, and still more preferably 0.50 N/12 mm or less.

A film resistance of the separator of the present disclosure is preferably from 1 ohm·cm$^2$ to 10 ohm·cm$^2$ from a viewpoint of load characteristics of a battery. Here, the film resistance is a resistance value when the separator is impregnated with an electrolytic solution, and is measured by an alternating current method. Although the value of the film resistance differs depending on the kind and temperature of the electrolytic solution, the value is one that is measured at 20° C. using 1 mol/L LiBF$_4$-propylene carbonate:ethylene carbonate (mass ratio 1:1) as the electrolytic solution.

A tortuosity of the separator of the present disclosure is preferably from 1.5 to 2.5 from a viewpoint of ion permeability. The tortuosity of the separator is a value determined by the following Equality.

$$\tau = \{(R \times \varepsilon/100)/(r \times t)\}^{1/2}$$

In the Equality, r is the tortuosity of the separator, R is a film resistance (ohm·cm$^2$) of the separator when impregnated with an electrolytic solution, r is a resistivity (ohm·cm) of the electrolytic solution, c is the porosity (')/i)) of the separator, and t is a film thickness (cm) of the separator. As the electrolytic solution, 1 mol/L LiBF$_4$-propylene carbonate:ethylene carbonate (mass ratio 1:1) is used. The film resistance is measured at 20° C.

A chargeability of the separator of the present disclosure can be checked by a half-life measurement method described in HS L1094:1997. Note that since the use environment of the separator is a dry environment, it is desirable to check the chargeability in consideration of the environment. In the present disclosure, a half-life measured under an environment with a temperature 50° C. below a dew point by after keeping a sample for one hour or more under an environment of a temperature 50° C. below a dew point to adjust the humidity is used as an indicator of chargeability.

In order to ensure favorable handling property, the half-life measured by such a method is preferably as small as possible, and the smaller the half-life is, the higher the antistatic effect is. In the present disclosure, the antistatic effect is dramatically improved by including a layered clay mineral in the adhesive porous layer.

A water content (on a mass basis) in the separator of the present disclosure is preferably 1,000 ppm or less. The smaller the water content of the separator is, the more the reaction between an electrolytic solution and water can be suppressed when a battery is constituted therewith, generation of gas in a battery can be suppressed, and the cycle characteristics of the battery are improved. From this viewpoint, the water content (on a mass basis) contained in the separator is more preferably 800 ppm or less, and still more preferably 500 ppm or less.

[Manufacturing Method of Separator for Non-Aqueous Secondary Battery]

The separator of the present disclosure is manufactured by, for example, a method in which a coating liquid containing at least the PVDF resin is coated on the porous substrate to form a coating layer, and then the PVDF resin contained in the coating layer is solidified to form the adhesive porous layer on the porous substrate. Specifically, the adhesive porous layer can be formed by, for example, a wet coating method set forth below Hereinafter, an embodiment including a crystal form regulator in an adhesive porous layer will be described as an example.

The wet coating method is a film forming method in which (i) a coating liquid preparation step of preparing a coating liquid by dissolving or dispersing a PVDF resin and a crystal form regulator (preferably a layered clay mineral) in a solvent, (ii) a coating step of applying the coating liquid on one side or both sides of a porous substrate to form a coating layer, (iii) a coagulation step of obtaining a composite film having an adhesive porous layer containing the PVDF resin and a crystal form regulator (preferably a layered clay mineral) on one side or both sides of a porous substrate by solidifying the PVDF resin by bringing the coating layer into contact with a coagulation liquid, (iv) a water washing step of washing the composite film with water, and (v) a drying step of removing water from the composite film are performed to form an adhesive porous layer on the porous substrate. Details of the wet coating method suitable for the separator of the present disclosure are as follows.

(i) Coating Liquid Preparation Step

The coating liquid preparation step is a step of preparing a coating liquid containing a PVDF resin and a crystal form regulator (preferably a layered clay mineral). The coating liquid is prepared, for example, by dissolving the PVDF resin in a solvent and further dispersing the crystal form regulator (preferably a layered clay mineral).

Preferable examples of the solvent to be used in preparation of the coating liquid for dissolving the PVDF resin (hereinafter also referred to as a "good solvent") include polar amide solvents such as N-methylpyrrolidone, dimethylacetamide, dimethylformamide and dimethylformamide.

Preferably, a phase separation agent that induces phase separation is mixed with the good solvent from the viewpoint of forming a porous layer having a favorable porous structure. Examples of the phase separation agent include water, methanol, ethanol, propyl alcohol, butyl alcohol, butanediol, ethylene glycol, propylene glycol and tripropylene glycol. Preferably, the phase separation agent is mixed with the good solvent in an amount in a range which ensures that a viscosity suitable for coating can be secured.

The solvent to be used for preparation of the coating liquid is preferably a mixed solvent which contains the good solvent in an amount of 60% by mass or more and the phase separation agent in an amount of 40% by mass or less, from the viewpoint of forming a favorable porous structure.

A concentration of the resin in the coating liquid is preferably from 1% by mass to 20% by mass from the viewpoint of forming a favorable porous structure.

When a filler or other components are contained in the adhesive porous layer, the filler and other components may be dissolved or dispersed in the coating liquid. A total concentration of the layered clay mineral and the filler in the coating liquid is preferably from 0.01% by mass to 20% by mass with respect to a mass of the coating liquid.

The coating liquid may contain a dispersant such as a surfactant, a thickener, a wetting agent, a defoaming agent, a pH adjusting agent, and the like. These additives may be remained as long as they are electrochemically stable under use conditions of a non-aqueous secondary battery and do not inhibit an in-battery reaction.

(ii) Coating Step

The coating step is a step of applying the coating liquid to one side or both sides of a porous substrate to form a coating layer. Conventional coating means such as Mayer bar, die coater, reverse roll coater, and gravure coater may be applied to coat the porous substrate. In a case in which the adhesive porous layer is formed on both sides of the porous substrate, it is preferable from the viewpoint of productivity that the coating liquid is applied to the substrate simultaneously on both sides.

(iii) Coagulation Step

The coagulation step is a step of bringing the coating layer into contact with a coagulation liquid to solidify the PVDF resin while inducing phase separation. Specifically, in the coagulation step, it is preferable to immerse the porous substrate having the coating layer in the coagulation liquid, and it is more preferable to pass the porous substrate through a tank (coagulation tank) containing the coagulation liquid.

The coagulation liquid is generally composed of a good solvent and a phase separation agent used for preparing a coating liquid and water. From a viewpoint of production, it is preferable to adjust a mixing ratio of the good solvent and the phase separation agent to that of a mixed solvent used for preparing the coating liquid. From a viewpoint of forming a porous structure and productivity, it is appropriate that a content of water in the coagulation liquid is from 40% by mass to 90% by mass. By controlling the content of water, the phase separation rate can be adjusted, and the crystal structure of the PVDF resin in the adhesive porous layer can be controlled. A temperature of the coagulating liquid is, for example, 20° C. to 50° C.

(iv) Water Washing Step

The water washing step is a step performed for the purpose of removing the solvent (the solvent forming the coating liquid and the solvent forming the coagulation liquid) contained in the composite film. Specifically, it is preferable that the water washing step is carried out by conveying the composite film in a water bath. The temperature of water for washing is, for example, from 0° C. to 0° C.

(v) Drying Step

The drying step is a step of removing water from the composite film after the water washing step. The drying method is not limited, and examples thereof include a method of bringing the composite film into contact with a heat generating member; a method of conveying the composite film in a chamber adjusted in temperature and humidity; and a method of applying hot air to the composite film.

Besides the wet coating method described above, the adhesive porous layer can also be produced by a dry coating method. The dry coating method is a method in which a coating liquid containing at least a PVDF resin is applied to a porous substrate and the coating layer is dried to volatilize and remove the solvent to obtain an adhesive porous layer. Since a porous layer tends to become dense in the dry coating method as compared with the wet coating method, the wet coating method is more preferable from a viewpoint of obtaining a good porous structure.

A stretching step may be provided before and/or after the (iv) water washing step or (v) drying step for the purpose of controlling the area intensity ratio of the β-phase-crystal-derived peak and the half-width of an endothermic peak of the adhesive porous layer. The stretching temperature is preferably from 20° C. to 130° C., and the stretching magnification is preferably from 1.01 times to 1.10 times.

<Non-Aqueous Secondary Battery>

A non-aqueous secondary battery of the present disclosure is a non-aqueous secondary battery which is configured to produce an electromotive force by doping/de-doping of lithium, the non-aqueous secondary battery including a positive electrode, a negative electrode, and the separator for a non-aqueous secondary battery of the present disclosure. The doping means absorption, holding, adsorption or insertion, which means a phenomenon in Which lithium ions enter an active material of an electrode such as a positive electrode.

The non-aqueous secondary battery of the present disclosure has, for example, a structure in which a battery element with a negative electrode and a positive electrode facing each other with a separator interposed therebetween is enclosed in an outer packaging material together with an electrolytic solution. The non-aqueous secondary battery of the present disclosure is suitable as a non-aqueous electrolyte secondary battery, particularly a lithium ion secondary battery.

One embodiment of the non-aqueous secondary battery of the present disclosure includes the separator including the adhesive porous layer including the PVDF resin and the layered clay mineral. In the non-aqueous secondary battery of this embodiment, since the adhesive porous layer of the separator contains the PVDF resin, its adhesion to an electrode is excellent, and since the layer contains the layered clay mineral, it is less likely to charge, and therefore, reduction of internal resistance of the battery is achieved, and thus the battery output is excellent.

One embodiment of the non-aqueous secondary battery of the present disclosure includes the separator which includes the porous substrate, the adhesive porous layer including the PVDF resin and the layered clay mineral provided on one side or both sides of the porous substrate, a weight of the adhesive porous layer being from 0.5 g/m$^2$ to 2.0 g/m$^2$ on one side of the porous substrate. In the non-aqueous secondary battery of this embodiment, adhesion between an electrode and the separator is excellent, and as a result, an in-battery reaction during charging and discharging is made uniform, and the load characteristics are excellent.

Hereinafter, examples of aspects of a positive electrode, a negative electrode, an electrolytic solution and an outer packaging material each included in the non-aqueous secondary battery of the present disclosure will be described.

The positive electrode has, for example, a structure in which an active material layer containing a positive electrode active material and a binder resin is formed on a current collector. The active material layer may further contain a conductive assistant. Examples of the positive electrode active material include lithium-containing transition metal oxides, specific examples of which including $LiCoO_2$, $LiNiO_2$, $LiMn_{1/2}Ni_{1/2}O_2$, $LiCo_{1/3}Mn_{1/3}Ni_{1/3}O_2$, $LiMn_2O_4$, $LiFePO_4$, $LiCo_{1/2}Ni_{1/2}O_2$ and $LiAl_{1/4}Ni_{3/4}O_2$. Examples of the binder resin include PVDF resins. Examples of the conductive assistant include carbon materials such as acetylene black, ketjen black and graphite powders. Examples of the current collector include aluminum foils, titanium foils and stainless foils having a thickness of, for example, from 5 µm to 20 µm.

According to one embodiment of the non-aqueous secondary battery of the present disclosure, since the adhesive porous layer is excellent in oxidation resistance, disposition of the adhesive porous layer of the separator on the positive electrode side enables to easily apply, as a positive electrode active material, one that is capable of operating at a high voltage of 4.2 V or more, such as $LiMn_{1/2}Ni_{1/2}O_2$ or $LiCo_{1/3}Mn_{1/3}Ni_{1/3}O_2$.

The negative electrode may have, for example, a structure in which an active material layer containing a negative active material and a binder resin is formed on a current collector. The active material layer may further contain a conductive assistant. Examples of the negative active material include materials capable of electrochemically absorbing lithium, specific examples of which including: carbon materials; and alloys of lithium and silicon, tin, aluminum or the like. Examples of the binder resin include PVDF resins and styrene-butadiene copolymers. Examples of the conductive assistant include carbon materials such as acetylene black, ketjen black and graphite powders. Examples of the current collector include copper foils, nickel foils and stainless foils having a thickness of, for example, from 5 µm to 20 µm. Alternatively, in place of the negative electrode described above, a metal lithium foil may be used as a negative electrode.

The electrolytic solution is, for example, a solution obtained by dissolving a lithium salt in a non-aqueous solvent. Examples of the lithium salt include $LiPF_6$, $LiBF_4$ and $LiClO_4$. Examples of the non-aqueous solvent include cyclic carbonates such as ethylene carbonate, propylene carbonate, fluoroethylene carbonate, difluoroethylene carbonate and vinylene carbonate; chain carbonates such as dimethyl carbonate, diethyl carbonate, ethylmethyl carbonate and fluorine-substituted products thereof; and cyclic esters such as γ-butyrolactone and γ-valerolactone. They may be used singly, or in combination of two or more kinds thereof. The electrolytic solution is preferably one obtained by mixing a cyclic carbonate and a chain carbonate at a mass ratio (cyclic carbonate:chain carbonate) of from 20:80 to 40:60, and dissolving a lithium salt therein in an amount of from 0.5 mol/L to 1.5 mol/L.

Examples of the outer packaging material include metal cans and aluminum laminated film packages. Examples of a shape of the battery include a rectangular shape, a circular-cylindrical shape and a coin shape, and the separator of the present disclosure is suitable for any shape.

Examples of a manufacturing method of the non-aqueous secondary battery of the present disclosure include: a manufacturing method including impregnating a separator with an electrolytic solution, performing a heat-pressing treatment (referred to as "wet heat-press" in the present specification)) to adhere the separator to an electrode; and a manufacturing method including performing a heat-pressing treatment (referred to as "dry heat-press" in the present specification) without impregnating the separator with the electrolytic solution to adhere the separator to an electrode.

The non-aqueous secondary battery of the present disclosure can be manufactured by manufacturing a layered body in which the separator of the present disclosure is disposed between a positive electrode and a negative electrode and then using the layered body, for example, in accordance with any one of the following manufacturing methods 1) to 3).

Manufacturing method 1) The electrodes and the separator are adhered by heat-pressing (dry heat-press) to form a layered body, then the layered body is placed in an outer packaging material (for example, pack made of aluminum laminate film. The same applies below), and the electrolytic solution is injected therein. The layered body is further heat-pressed (wet heat-press) from above the outer packaging material to adhere the electrode and the separator and seal the outer packaging material.

Manufacturing method 2) The layered body is housed in an outer packaging material, an electrolytic solution is injected therein, and the layered body is heat-pressed (wet heat-pressed) from above the outer packaging material to adhere the electrode and the separator and seal the outer packaging material.

Manufacturing method 3) The layered body is heat-pressed (dry heat-pressed) to adhere the electrode and the separator, and then the layered body is housed in an outer packaging material, an electrolytic solution is injected therein, and the outer packaging material is sealed.

A method of disposing the separator between the positive electrode and the negative electrode in production of a non-aqueous secondary battery may be a method in which at least one positive electrode, at least one separator and at least one negative electrode are layered in this order one on another (so called a stacking method), or a method in which the positive electrode, the separator, the negative electrode and the separator are superimposed one on another in this order, and wound in the length direction.

A condition of the heat-pressing in the manufacturing methods 1) to 3) may include, in both of the dry heat-press and the wet heat-press, a pressure of from 0.1 MPa to 20 MPa and a temperature of from 60° C. to 130° C. (which being preferably from 70° C. to 110° C.).

Due to the inclusion of the adhesive porous layer as an outermost layer, the separator of the present disclosure can be bonded to an electrode when superimposed on the electrode. Therefore, the pressing is not an essential step in production of a battery, while it is preferable to perform the pressing in view of improving adherence between the electrode and the separator. It is preferable to perform the pressing in parallel with heating (heat-pressing) for further improving adherence between the electrode and the separator.

EXAMPLES

The separator and the non-aqueous secondary battery of the present disclosure will be described further in detail below by way of Examples. The materials, amounts, ratios, procedures and so on can be appropriately modified as long as it does not depart from the spirit of the present disclosure. Accordingly, the scope of the separator and the non-aqueous secondary battery of the present disclosure cannot be interpreted as being limited by way of examples below.

<Measurement Methods and Evaluation Methods>

Measurement methods and evaluation methods applied in Examples and Comparative Examples are as follows.

[Weight Average Molecular Weight of Resin]

A weight average molecular weight of a resin was measured by using a gel permeation chromatograph apparatus (G-900, manufactured by JASCO Corporation), two pieces of column TSKGEL SUPER AWM-H (manufactured by TOSOH CORPORATION) and N,N-dimethylformamide at a condition of a temperature of 40° C. and a flow rate of 10 mL/min, the measured value being expressed in terms of polystyrene.

[Thickness]

A thickness (μm) of each of the porous substrate and the separator was determined by measuring the thickness at 20 selected spots using a contact-type thickness meter (LITEMATIC manufactured by Mitutoyo Corporation), and averaging the measured values. As a measurement terminal, one having a circular-cylindrical shape with a diameter of 5 mm was used, and an adjustment was made so that a load of 7 g was applied during the measurement.

[Weight of Adhesive Porous Layer]

Regarding a weight (g/m$^2$) of an adhesive porous layer, a total weight thereof on both sides of a porous substrate was determined by subtracting a basis weight of the porous substrate from a basis weight of a separator. The basis weight (weight per 1 m$^2$) was determined by cutting out a separator or the porous substrate into a size of 10 cm×30 cm, weighing the weight, and dividing the weight by the area.

[Area Intensity Ratio of β-Phase-Crystal-Derived Peak of PVDF Resin]

An adhesive porous layer was peeled off from a separator to obtain 100 mg of powdery sample, and X-ray diffraction measurement was carried out as described below.

Measurement apparatus: Sample horizontal type strong X-ray diffraction measurement apparatus, Rigaku Corporation, RINT-TTR III X-ray source: Cu-Kα (λ=1.5418 Å), rotating anticathode, output 50 kV×300 mA (15 kW)

Parallel beam optical system: divergence slit (DS) 1 mm, divergence vertical limit slit (HS) 10 mm, scattering slit (SS) open, receiving slit (RS) open. A long slit for powder diffraction is used.

Measurement conditions: 2θ/θ scanning, scanning angle (2θ) from 18° to 23°, step scan measurement (FT measurement), step width 0.01°, 4 seconds scanning. Si non-reflective plate is used.

X-ray diffraction measurement results were analyzed using powder X-ray diffraction pattern analysis software (Rigaku Corporation, JADE 6.5). Based on a peak position (2θ=20°) of α-phase-crystal of polyvinylidene fluoride (that is, a homopolymer of vinylidene fluoride) and a peak position of β-phase-crystal (2θ=20.7°), peak separation and attribution were determined. From an area intensity of α-phase-crystal-derived peak (area intensity of peak of (020) plane existing near 2θ=20°) and an area intensity of β-phase-crystal-derived peak (sum of area intensities of (110) plane peak and (200) plane peak existing near 2θ=20.7°), an area intensity ratio of the β-phase-crystal derived peak was determined according to the following Formula.

Area intensity ratio of β-phase-crystal-derived peak [%]=area intensity of β-phase-crystal-derived peak÷(area intensity of α-phase-crystal-derived peak+area intensity of β-phase-crystal-derived peak)×100

[Half-Width of Endothermic Peak of Adhesive Porous Layer]

The adhesive porous layer was peeled off from the separator, and 5 mg of powdery sample was obtained. Using a differential scanning calorimeter (TA Instruments Japan Inc., Q20), measurement was carried out under alumina powder as a reference material under a nitrogen atmosphere at a heating rate of 10° C./min to obtain a DSC curve. From the DSC curve, a half-width of an endothermic peak was determined.

[Peel Strength Between Porous Substrate and Porous Layer]

An adhesive tape (product No. 550R-12 manufactured by Scotch Company) having a width of 12 mm and a length of 15 cm was attached to a surface of an adhesive porous layer on one side of the separator, and the separator was cut in conformity with the width and the length of the adhesive tape to obtain a measurement sample. In attachment of the adhesive tape to the separator, a length direction was made coincident with an MD direction of the separator. The adhesive tape was used as a support for separating the adhesive porous layer on one side. The measurement sample was left standing in an atmosphere at a temperature of 23±1° C. and a relative humidity of 50±5% for 24 hours or more, and the following measurement was made in the same atmosphere. Separation of 10 cm of the adhesive tape was performed together with the adhesive porous layer which is immediately below the adhesive tape, so that the separator was separated by about 10 cm into a laminated body (1) of the adhesive tape and the adhesive porous layer and a laminated body (2) of the porous substrate and the other adhesive porous layer. An end of the laminated body (1) was fixed to an upper chuck of a Tensilon (RTC-1210A manufactured by ORIENTEC CORPORATION), and an end of the laminated body (2) was fixed to a lower chuck of the Tensilon. The measurement sample was suspended in the gravity direction to ensure that the tension angle (angle of the laminated body (1) to the measurement sample) was 180°. The laminated body (1) was drawn at a tension speed of 20 mm/min, and the load in separation of the laminated body (1) from the porous substrate was measured. The load was taken at intervals of 0.4 mm between the points of 10 mm and 40 mm from the start of the measurement, and an average of the loads was defined as a peel strength.

[Chargeability (Charge Decay Half-Life)]

In the half-life measurement method described in HS L1094:1997, the charge decay half-life (seconds) of the separator was measured using a charge charge attenuation measurement device (Shishido Electrostatic, Ltd., HONESTMETER ANALYZER V1). A sample was allowed to stand in a dry room at a temperature 50° C. below a dew point for one day to adjust the humidity, and the sample after the standing was measured in a dry room at a temperature 50° C. below a dew point,

[Gurley Value]

Gurley values (sec/100 cc) of a porous substrate and a separator were measured using a Gurley type densometer Seiki Seisaku-sho, Ltd., G-B2C) in accordance with JIS P8117:2009. Table 2 lists the value obtained by subtracting the Gurley value of the porous substrate from the Gurley value of the separator as "Δ Gurley value".

[Peel Strength (1) Between Electrode and Separator]

89.5 g of lithium cobalt oxide powder as a positive electrode active material, 4.5 g of acetylene black as a conductive assistant, and 6 g of polyvinylidene fluoride as a binder were dissolved in N-methyl-pyrrolidone such a manner that a concentration of the polyvinylidene fluoride would be 6% by mass, and the resultant solution was stirred in a dual arm-type mixer to prepare a positive electrode slurry. The positive electrode slurry was applied to one side of a 20 μm-thick aluminum foil, and dried, and pressing was then performed to obtain a positive electrode having a positive electrode active material layer on one side thereof.

The positive electrode (coated on one side) obtained as above and an aluminum foil (thickness: 20 μm) were respectively cut to a width of 1.5 cm and a length of 7 cm, and each separator obtained in Examples and Comparative Examples as set forth below was cut to a width of 1.8 cm and a length of 7.5 cm. The positive electrode, the separator and the aluminum foil were layered in this order to prepare a laminated body. The laminated body was impregnated with an electrolytic solution (1 mol/L LiBF$_4$-ethylene carbonate: propylene carbonate [mass ratio 1:1]), and put into an aluminum laminated film package. Next, an inside of the package was brought into a vacuum state using a vacuum sealer, and the laminated body was heat-pressed together with the package using a heat-pressing machine, thereby bonding the positive electrode and the separator to each other. Conditions for heat-pressing were made as set forth below.

Load: 1 MPa
Temperature: changed from 70° C. to 130° C. with increments of 5° C.
Heat-pressing time: 2 minutes After heat-pressing, the package was then unsealed, the laminated body was taken out from the package, and the aluminum foil was removed from the laminated body to obtain a measurement sample. Anon-coated side of the positive electrode of the measurement sample was fixed to a metal plate with a double-sided tape, and the metal plate was fixed to a lower chuck of a Tensilon (STB-1225S manufactured by A&D Company, Limited). Here, the metal plate was fixed to the Tensilon in such a manner that the length direction of the measurement sample was coincident with the gravity direction. The separator was separated from the positive electrode by about 2 cm from the lower end, and the end was fixed to an upper chuck to ensure that the tension angle (angle of the separator to the measurement sample) was 180°. The separator was drawn at a tension speed of 20 mm/min, and the load in separation of the separator from the positive electrode was measured. The load was measured at intervals of 0.4 mm between the points of 10 mm and 40 mm from the start of the measurement, an average of the loads was defined as a peel strength between the electrode and the separator (N/15 mm).

As illustrated in FIG. 1, the measured values were plotted on a graph in which the vertical axis represents the peel strength between the electrode and the separator and the horizontal axis represents the heat-pressing temperature, adjacent plots were connected by a straight line, and the lower limit value and the upper limit value of the temperature range where the peel strength was 0.2 N/15 mm or more, and a difference (temperature gap) between the lower limit value and the upper limit value was obtained. Regarding the peel strength (1), a range of the heat-pressing temperature where the peel strength is 0.2 N/15 mm or more is referred to as a "wet adhering temperature range".

[Peel Strength (2) Between Electrode and Separator]

A positive electrode was prepared in the similar manner as in "Peel Strength (1) between Electrode and Separator" described above. The positive electrode (coated on one side) and an aluminum foil (thickness: 20 μm) were respectively cut to a width of 1.5 cm and a length of 7 cm, and each separator obtained in Examples and Comparative Examples as set forth below was cut to a width of 1.8 cm and a length of 7.5 cm. The positive electrode, the separator and the aluminum foil were layered in this order to prepare a laminated body. The laminated body was put into an aluminum laminated film package. Next, an inside of the package was brought into a vacuum state using a vacuum sealer, and the laminated body was heat-pressed together with the package using a heat-pressing machine, thereby bonding the positive electrode and the separator to each other. Conditions for heat-pressing were made as set forth below.

Load: 1 MPa
Temperature: changed from 70° C. to 130° C. with increments of 5° C.
Heat-pressing time: 2 minutes After heat-pressing, the package was then unsealed, the laminated body was taken out from the package, and the aluminum foil was removed from the laminated body to obtain a measurement sample. A peel strength between the electrode and the separator (N/15 mm) was measured in the similar manner as in "Peel Strength (1) between Electrode and Separator" described above. Then, as illustrated in FIG. 1, the measured values were plotted on a graph in which the vertical axis represents the peel strength between the electrode and the separator and the horizontal axis represents the heat-pressing temperature, adjacent plots were connected by a straight line, and the lower limit value and the upper limit value of the temperature range where the peel strength was 002 N/15 mm or more, and a difference (temperature gap) between the lower limit value and the upper limit value was obtained. Regarding the peel strength (2), a range of the heat-pressing temperature where the peel strength is 0.02 N/15 mm or more is referred to as a "dry adhering temperature range"

[Production Yield of Battery]
—Preparation of Positive Electrode—

A positive electrode was prepared in the similar manner as in "Peel Strength (1) between Electrode and Separator" described above.

—Preparation of Negative Electrode—

300 g of artificial graphite as a negative electrode active material, 7.5 g of a water-soluble dispersion including a modified form of a styrene-butadiene copolymer in an amount of 40% by mass as a binder, 3 g of carboxymethyl cellulose as a thickener, and a proper quantity of water were stirred using a double-arm mixer, thereby preparing a slurry for forming a negative electrode. The slurry for forming a negative electrode was coated on a copper foil having a thickness of 10 μm as a negative electrode current collector, and the resulting coated membrane was dried, followed by pressing, to produce a negative electrode having a negative electrode active material layer.

—Preparation of Battery—

Two separators (width: 108 mm) obtained in the following Examples and Comparative Examples were prepared and stacked, and one end in the MD direction was used to wrap around a stainless steel core. A positive electrode (width: 106.5 mm) welded with a lead tab was sandwiched between the two separators, a negative electrode (width: 107 mm) welded with a lead tab was arranged on one separator, and this layered body was wound to continuously manufacture 60 wound electrode bodies. The obtained wound electrode body was housed in a pack made of an aluminum laminate film, impregnated with an electrolytic solution (1 mol/L LiPF6-ethylene carbonate:ethyl methyl carbonate [mass ratio 3:7]), and sealed using a vacuum sealer. Next, the aluminum laminate film pack housing the wound electrode body and the electrolytic solution was heat-pressed with a heat-pressing machine to obtain a battery. Conditions of heat-pressing were as follows, Load: 1 MPa.
Heat-pressing temperature: Three temperatures listed on Table 2. Twenty samples were prepared for each temperature.
Heat-pressing time: 2 minutes.
—Test—

The battery was charged and discharged for 100 cycles. In this test, charging was performed at constant current and constant voltage charging of 0.5 C and 4.2 V, and discharging was performed at constant current discharge of 0.5 C and 2.75 V cutoff After 100 cycles of charging and discharging, the battery was disassembled, and lithium dendrite precipitated on a negative electrode was observed. A case in which lithium dendrite was not observed was judged as acceptable, and a case in which lithium dendrite was observed was judged as unacceptable. Then, the number proportion (%) of the acceptable batteries was calculated and classified as follows.

A: The percentage of the number judged as acceptable is 100%.
B: The percentage of the number judged as acceptable is 95% or more but less than 100%.
C: The percentage of the number judged as acceptable is less than 95%.

[Peel Strength (3) Between Electrode and Separator]

A positive electrode was prepared in the similar manner as in "Peel Strength (1) between Electrode and Separator" described above. The positive electrode (coated on one side) and an aluminum foil (thickness: 20 μm) were respectively cut to a width of 1.5 cm and a length of 7 cm, and each separator obtained in Examples and Comparative Examples as set forth below was cut to a width of 1.8 cm and a length of 7.5 cm. The positive electrode, the separator and the aluminum foil were layered in this order to prepare a laminated body. The laminated body was impregnated with an electrolytic solution (1 mol/L $LiBF_4$-ethylene carbonate:propylene carbonate [mass ratio 1:1]), and put into an aluminum laminated film package. Next, an inside of the package was brought into a vacuum state using a vacuum sealer, and the laminated body was heat-pressed together with the package using a heat-pressing machine, thereby bonding the positive electrode and the separator to each other. Conditions for heat-pressing were made as set forth below Load: 1 MPa
Temperature: shown in Table 2
Heat-pressing time: 2 minutes After heat-pressing, the package was then unsealed, the laminated body was taken out from the package, and the aluminum foil was removed from the laminated body to obtain a measurement sample. A peel strength between the electrode and the separator (N/15 mm) was measured in the similar manner as in "Peel Strength (1) between Electrode and Separator" described above.

—Preparation of Positive Electrode—

A positive electrode was prepared in the similar manner as in "Peel Strength (1) between Electrode and Separator" described above.

—Preparation of Negative Electrode—

A negative electrode was prepared in the similar manner as in "Production yield of Battery" described above.

—Production of Battery—

A lead tab was welded to each of the positive electrode and negative electrode. Then, the positive electrode, each separator obtained in Examples and Comparative examples shown below, and the negative electrode were stacked in this order to produce a stacked body. The laminated body was put into an aluminum laminated film pack and impregnated with an electrolytic solution (1 mol/L $LiPF_6$-ethylene carbonate:ethyl methyl carbonate [mass ratio 3:7]) by pouring the electrolytic solution thereto. Next, using a vacuum sealer, the inside of the pack was made vacuum, and the pack was tentatively sealed, and, using a heat press machine, the stacked body together with the pack was heat-pressed in a direction of the stacking, thereby bonding the electrode and the separator and sealing the pack. The heat pressing conditions were as set forth below Load: 20 kg per 1 $cm^2$ of the electrode
Heat-pressing temperature: same as heat-pressing temperature shown in [Peeling strength (3)] in Table 2
Heat-pressing time: 2 minutes
—Test—

The battery was charged and discharged in an environment of 25° C., the discharge capacity when discharged at 0.2 C and the discharge capacity when discharged at 2 C were measured, and the value (%) obtained by dividing the latter by the former was taken as the load characteristics. Charging conditions were constant current constant voltage charging of 0.2 C and 4.2 V for 8 hours, and discharging conditions were constant current discharge of 2.75 V cutoff <Preparation of Separator>

Example 1

A PVDF resin and a layered clay mineral were dissolved or dispersed in a solvent to prepare a coating liquid. Equal amounts of the coating liquid were applied to both sides of a porous substrate, and the coated porous substrate was immersed in a coagulation liquid for solidification to obtain a composite film. Next, the composite film was washed with water and dried to obtain a separator having adhesive porous layers formed on both sides of a porous substrate. Details of the materials are as follows.

Solvent: a mixture of dimethylacetamide and tripropylene glycol with a mixing ratio (mass ratio) of 80:20.
PVDF resin: vinylidene fluoride-hexafluoropropylene copolymer, weight average molecular weight: 1,130,000, hexafluoropropylene content: 2.4 mol %.
Layered clay mineral: LUCENTITE SEN (Katakura & Co-op Agri Corporation), organic onium ion modified hectorite, aspect ratio: 30.
Coating liquid: Concentration of PVDF resin is 5.0% by mass, with a content ratio (mass ratio) of PVDF resin and layered clay mineral of 99:1.
Porous substrate: polyethylene microporous film, film thickness: 9 μm, porosity: 40%, Gurley value: 152 sec/100 cc.
Coagulation liquid: a mixed solution of dimethylacetamide, tripropylene glycol and water with a mixing ratio (mass ratio) of 30:8:62, temperature: 40° C.

Example 2

A separator having adhesive porous layers formed on both sides of a polyethylene microporous film was obtained in the same manner as in Example 1 except that the content ratio of PVDF resin and layered clay mineral contained in the coating liquid was changed to 98:2.

Example 3

A separator having adhesive porous layers formed on both sides of a polyethylene microporous film was obtained in the same manner as in Example 1 except that the content ratio of PVDF resin and layered clay mineral contained in the coating liquid was changed to 95:5.

Example 4

A PVDF resin was dissolved in a solvent to prepare a coating liquid. Equal amounts of the coating liquid were applied to both sides of a porous substrate. The coated porous substrate was subject to drying at 60° C. for 12 minutes and immersed in a coagulation liquid for solidification to obtain a composite film. Next, the composite film was washed with water and dried to obtain a separator having adhesive porous layers formed on both sides of a porous substrate. Details of the materials are as follows.
- Solvent: a mixture of dimethylacetamide and tripropylene glycol with a mixing ratio (mass ratio) of 80:20.
- PVDF resin: vinylidene fluoride-hexafluoropropylene copolymer, weight average molecular weight: 1,130,000, hexafluoropropylene content: 2.4 mol %.
- Coating liquid: Concentration of PVDF resin is 5.0% by mass.
- Porous substrate: polyethylene microporous film, film thickness: 9 μm, porosity: 40%, Gurley value: 152 sec/1.00 cc.
- Coagulation liquid: a mixed solution of dimethylacetamide, tripropylene glycol and water with a mixing ratio (mass ratio) of 30:8:62, temperature: 40° C.

Comparative Example 1

A separator having adhesive porous layers formed on both sides of a polyethylene microporous film was obtained in the similar manner as in Example 1 except that the coating liquid was prepared without adding the layered clay mineral.

Example 5

A PVDF resin and a layered clay mineral were dissolved or dispersed in a solvent to prepare a coating liquid. Equal amounts of the coating liquid were applied to both sides of a porous substrate, and the coated porous substrate was immersed in a coagulation liquid for solidification to obtain a composite film. Next, the composite film was washed with water and dried to obtain a separator having adhesive porous layers formed on both sides of a porous substrate. Details of the materials are as follows.
- Solvent: a mixture of dimethylacetamide and tripropylene glycol with a mixing ratio (mass ratio) of 80:20.
- PVDF resin: vinylidene fluoride-hexafluoropropylene copolymer, weight average molecular weight: 1,130,000, hexafluoropropylene content: 2.4 mol %.
- Layered clay mineral: LUCENTITE STN (Katakura & Co-op Agri Corporation), organic onium ion modified hectorite, aspect ratio: 30.
- Coating liquid: Concentration of PVDF resin is 3.8% by mass, with a content ratio (mass ratio) of PVDF resin and layered clay mineral of 99:1.
- Porous substrate: polyethylene microporous film, film thickness: 9 μm, porosity: 40%, Gurley value: 152 sec/100 cc.
- Coagulation liquid: a mixed solution of dimethylacetamide, tripropylene glycol and water with a mixing ratio (mass ratio) of 30:8:62, temperature: 40° C.

Example 6

A separator having adhesive porous layers formed on both sides of a polyethylene microporous film was obtained in the same manner as in Example 5 except that the content ratio of PVDF resin and layered clay mineral contained in the coating liquid was changed to 98:2.

Example 7

A separator having adhesive porous layers formed on both sides of a polyethylene microporous film was obtained in the same manner as in Example 5 except that the content ratio of PVDF resin and layered clay mineral contained in the coating liquid was changed to 96:4.

Comparative Example 2

A separator having adhesive porous layers formed on both sides of a polyethylene microporous film was obtained in the similar manner as in Example 5 except that the coating liquid was prepared without adding the layered clay mineral. A peeling strength (1) thereof did not become equal to or more than a standard value. A maximum value of the peeling strength (1) thereof is shown in Table 2.

Example 8

A PVDF resin and a layered clay mineral were dissolved or dispersed in a solvent to prepare a coating liquid. Equal amounts of the coating liquid were applied to both sides of a porous substrate, and the coated porous substrate was immersed in a coagulation liquid for solidification to obtain a composite film. Next, the composite film was washed with water and dried to obtain a separator having adhesive porous layers formed on both sides of a porous substrate. Details of the materials are as follows.
- Solvent: a mixture of dimethylacetamide and tripropylene glycol with a mixing ratio (mass ratio) of 80:20.
- PVDF resin: vinylidene fluoride-hexafluoropropylene copolymer, weight average molecular weight: 1,930,000, hexafluoropropylene content: 1.1 mol %.
- Layered clay mineral: LUCENTITE SEN (Katakura & Co-op Agri Corporation), organic onium ion modified hectorite, aspect ratio: 30.
- Coating liquid: Concentration of PVDF resin is 3.8% by mass, with a content ratio (mass ratio) of PVDF resin and layered clay mineral of 99:1.
- Porous substrate: polyethylene microporous film, film thickness: 9 μm, porosity: 40%, Gurley value: 152 sec/100 cc.
- Coagulation liquid: a mixed solution of dimethylacetamide, tripropylene glycol and water with a mixing ratio (mass ratio) of 30:8:62, temperature: 40° C.

Example 9

A separator having adhesive porous layers formed on both sides of a polyethylene microporous film was obtained in the same manner as in Example 8 except that the content ratio of PVDF resin and layered clay mineral contained in the coating liquid was changed to 98:2.

Example 10

A separator having adhesive porous layers formed on both sides of a polyethylene microporous film was obtained in the same manner as in Example 8 except that the content ratio of PVDF resin and layered clay mineral contained in the coating liquid was changed to 96:4.

Example 11

A separator having adhesive porous layers formed on both sides of a polyethylene microporous film was obtained in the same manner as in Example 8 except that the content ratio of PVDF resin and layered clay mineral contained in the coating liquid was changed to 94:6.

Example 12

A separator having adhesive porous layers formed on both sides of a polyethylene microporous film was obtained in the same manner as in Example 8 except that the content ratio of PVDF resin and layered clay mineral contained in the coating liquid was changed to 92:8.

Example 13

A separator having adhesive porous layers formed on both sides of a polyethylene microporous film was obtained in the same manner as in Example 8 except that the coating amount of the coating liquid was changed.

Example 14

A separator having adhesive porous layers formed on both sides of a polyethylene microporous film was obtained in the same manner as in Example 8 except that the coating amount of the coating liquid was changed. Both of peeling strengths (1) and (2) thereof did not become equal to or more than a standard value. Maximum values of the peeling strengths (1) and (2) thereof are shown in Table 2.

Example 15

A separator having adhesive porous layers formed on both sides of a polyethylene microporous film was obtained in the same manner as in Example 8 except that the layered clay mineral was changed to LUCENTITE STN (Katakura & Co-op Agri Corporation, organic onium ion modified hectorite, aspect ratio: 30).

Example 16

A separator having adhesive porous layers formed on both sides of a polyethylene microporous film was obtained in the same manner as in Example 15 except that the coating amount of the coating liquid was changed.

Example 17

A separator having adhesive porous layers formed on both sides of a polyethylene microporous film was obtained in the same manner as in Example 15 except that the content ratio of PVDF resin and layered clay mineral contained in the coating liquid was changed to 98:2.

Example 18

A separator having adhesive porous layers formed on both sides of a polyethylene microporous film was obtained in the same manner as in Example 15 except that the content ratio of PVDF resin and layered clay mineral contained in the coating liquid was changed to 96:4.

Example 19

A separator having adhesive porous layers formed on both sides of a polyethylene microporous film was obtained in the same manner as in Example 15 except that the content ratio of PVDF resin and layered clay mineral contained in the coating liquid was changed to 92:8.

Example 20

A separator having adhesive porous layers formed on both sides of a polyethylene microporous film was obtained in the same manner as in Example 8 except that the layered clay mineral was changed to LUCENTITE SPN (Katakura & Co-op Agri Corporation, organic onium ion modified hectorite, aspect ratio: 30).

Example 21

A separator having adhesive porous layers formed on both sides of a polyethylene microporous film was obtained in the same manner as in Example 8 except that the layered day mineral was changed to SOMASIF MEE (Katakura & Co-op Agri Corporation, fluoromica, aspect ratio: 50).

Example 22

A separator having adhesive porous layers formed on both sides of a polyethylene microporous film was obtained in the same manner as in Example 8 except that the layered clay mineral was changed to SOMASIF MTE (Katakura & Co-op Agri Corporation, organic onium ion modified swellable mica, aspect ratio: 50).

Example 23

Two kinds of PVDF resins and a layered clay mineral were dissolved or dispersed in a solvent to prepare a coating liquid. Equal amounts of the coating liquid were applied to both sides of a porous substrate, and the coated porous substrate was immersed in a coagulation liquid for solidification to obtain a composite film. Next, the composite film was washed with water and dried to obtain a separator having adhesive porous layers formed on both sides of a porous substrate. Details of the materials are as follows.

- Solvent: a mixture of dimethylacetamide and tripropylene glycol with a mixing ratio (mass ratio) of 80:20.
- PVDF resin A: vinylidene fluoride-hexafluoropropylene copolymer, weight average molecular weight: 1,930,000, hexafluoropropylene content: 1.1 mol %.
- PVDF resin B: vinylidene fluoride-hexafluoropropylene copolymer, weight average molecular weight: 470,000, hexafluoropropylene content: 4.8 mol %.
- Layered clay mineral: LUCENTITE STN (Katakura & Co-op Agri Corporation), organic onium ion modified hectorite, aspect ratio: 30.
- Coating liquid: Concentration of PVDF resin is 5.0% by mass, with a content ratio (mass ratio) of PVDF resin A and PVDF resin B of 50:50 and a content ratio (mass ratio) of PVDF resin and layered clay mineral of 99:1.
- Porous substrate: polyethylene microporous film, film thickness: 9 mm, porosity: 40%, Gurley value: 152 sec/100 cc.
- Coagulation liquid: a mixed solution of dimethylacetamide, tripropylene glycol and water with a mixing ratio (mass ratio) of 30:8:62, temperature: 40° C.

Comparative Example 3

A separator having adhesive porous layers formed on both sides of a polyethylene microporous film was obtained in the similar manner as in Example 23 except that the coating liquid was prepared without adding the layered clay mineral.

Comparative Example 4

A separator having adhesive porous layers formed on both sides of a polyethylene microporous film was obtained in the similar manner as in Example 8 except that the coating liquid was prepared without adding the layered clay mineral.

Comparative Example 5

A PVDF resin and a layered clay mineral were mixed in a solvent, dispersed by using a bead mil with a diameter of 0.65 mm, and further dispersed with adding alumina thereto to prepare a coating liquid. The coating liquid was applied to one side of a porous substrate, and the coated porous substrate was dried, immersed in water for 15 minutes to cause phase separation, and dried by subjecting to hot wind to obtain a separator having an adhesive porous layer (film thickness: 2.25 μm) formed on one side of a porous substrate. Details of the materials are as follows: This example did not adhere to an electrode in tests for the peeling strengths (1) to (3).
Solvent: N-methyl-2-pyrrolidone
PVDF resin: vinylidene fluoride-hexafluoropropylene copolymer, weight average molecular weight: 1,930,000, hexafluoropropylene content: 1.1 mol %.
Layered clay mineral: SOMASIF MEE (Katakura & Co-op Agri Corporation) fluoromica, aspect ratio: 50.
Inorganic particle: Alumina with an average particle diameter of 500 nm.

Coating liquid: Concentration of PVDF resin is 4.0% by mass, with a content ratio (mass ratio) of PVDF resin and layered clay mineral of 95:5 and an alumina content of 10 times a content of PVDF resin (in terms of mass).
Porous substrate: polyethylene microporous film, film thickness: 9 μm, porosity: 40%, Gurley value: 152 sec/100 cc.

Example 24

A separator having adhesive porous layers formed on both sides of a polyethylene microporous film was obtained in the same manner as in Example 15 except that the coating liquid was prepared to have a content ratio of the PVDF resin and the magnesium hydroxide particles of 40:60 by adding magnesium hydroxide particles (KISUMA SP, Kyowa Chemical Industry Co., Ltd., average particle diameter: 0.8 μm, BET specific surface area: 6.8 m$^2$/g).

Comparative Example 6

A separator having adhesive porous layers formed on both sides of a polyethylene microporous film was obtained in the similar manner as in Example 24 except that the coating liquid was prepared without adding the layered clay mineral. A peeling strength (2) thereof did not become equal to or more than a standard value. A maximum value of the peeling strength (2) thereof is shown in Table 2.

Physical properties and evaluation results of each example and comparative example are shown in Tables 1 and 2.

TABLE 1

| | Adhesive porous layer | | | | | |
|---|---|---|---|---|---|---|
| | PVDF-based resin | | | Layered clay mineral | | Inorganic particle |
| | Mw | HFP mol % | Concentration % by mass | Type | Mass ratio | Type |
| Example 1 | 1,130,000 | 2.4 | 5.0 | SEN | 1 | — |
| Example 2 | 1,130,000 | 2.4 | 5.0 | SEN | 2 | — |
| Example 3 | 1,130,000 | 2.4 | 5.0 | SEN | 5 | — |
| Example 4 | 1,130,000 | 2.4 | 5.0 | | — | — |
| Comparative Example 1 | 1,130,000 | 2.4 | 5.0 | | — | — |
| Example 5 | 1,130,000 | 2.4 | 3.8 | STN | 1 | — |
| Example 6 | 1,130,000 | 2.4 | 3.8 | STN | 2 | — |
| Example 7 | 1,130,000 | 2.4 | 3.8 | STN | 4 | — |
| Comparative Example 2 | 1,130,000 | 2.4 | 3.8 | — | | — |
| Example 8 | 1,930,000 | 1.1 | 3.8 | SEN | 1 | — |
| Example 9 | 1,930,000 | 1.1 | 3.8 | SEN | 2 | — |
| Example 10 | 1,930,000 | 1.1 | 3.8 | SEN | 4 | — |
| Example 11 | 1,930,000 | 1.1 | 3.8 | SEN | 6 | — |
| Example 12 | 1,930,000 | 1.1 | 3.8 | SEN | 8 | — |
| Example 13 | 1,930,000 | 1.1 | 3.8 | SEN | 1 | — |
| Example 14 | 1,930,000 | 1.1 | 3.8 | SEN | 1 | — |
| Example 15 | 1,930,000 | 1.1 | 3.8 | STN | 1 | — |
| Example 16 | 1,930,000 | 1.1 | 3.8 | STN | 1 | — |
| Example 17 | 1,930,000 | 1.1 | 3.8 | STN | 2 | — |
| Example 18 | 1,930,000 | 1.1 | 3.8 | STN | 4 | — |
| Example 19 | 1,930,000 | 1.1 | 3.8 | STN | 8 | — |
| Example 20 | 1,930,000 | 1.1 | 3.8 | SPN | 1 | — |
| Example 21 | 1,930,000 | 1.1 | 3.8 | MEE | 1 | — |
| Example 22 | 1,930,000 | 1.1 | 3.8 | MTE | 1 | — |
| Example 23 | 1,930,000 470,000 | 1.1 4.8 | 5.0 | STN | 1 | — |
| Comparative Example 3 | 1,930,000 470,000 | 1.1 4.8 | 5.0 | — | | — |

TABLE 1-continued

| | | | | | | |
|---|---|---|---|---|---|---|
| Comparative Example 4 | 1,930,000 | 1.1 | 3.8 | — | | — |
| Comparative Example 5 | 1,930,000 | 1.1 | 4.0 | MEE | 5 | Alumina |
| Example 24 | 1,930,000 | 1.1 | 3.8 | STN | 1 | Mg(OH)2 |
| Comparative Example 6 | 1,930,000 | 1.1 | 3.8 | — | | Mg(OH)2 |

| | Adhesive porous layer | | | | |
|---|---|---|---|---|---|
| | Weight (Total in both sides) g/m² | Area intensity ratio of β-crystal-derived peak % | Half-width of endothermic peak °C. | Peel strength N/12 mm | Charge decay half-life sec |
| Example 1 | 2.2 | 20.9 | 17.0 | 1.03 | 800 |
| Example 2 | 2.1 | 24.0 | 21.0 | 0.33 | 560 |
| Example 3 | 2.2 | 36.0 | 23.0 | 0.21 | 130 |
| Example 4 | 2.2 | 15.0 | 15.0 | 0.91 | 1000 |
| Comparative Example 1 | 2.2 | 1.8 | 12.0 | 0.87 | 1000 |
| Example 5 | 2.2 | 11.0 | 17.0 | 1.01 | 350 |
| Example 6 | 2.2 | 19.6 | 19.0 | 0.32 | 75 |
| Example 7 | 2.2 | 24.9 | 23.0 | 0.20 | 15 |
| Comparative Example 2 | 2.2 | 1.8 | 12.0 | 0.87 | 1000 |
| Example 8 | 2.2 | 30.7 | 15.0 | 0.45 | 640 |
| Example 9 | 2.3 | 31.8 | 16.9 | 0.28 | 300 |
| Example 10 | 2.3 | 32.2 | 19.0 | 0.21 | 190 |
| Example 11 | 2.2 | 33.3 | 20.8 | 0.13 | 90 |
| Example 12 | 2.2 | 35.5 | 21.2 | 0.10 | 70 |
| Example 13 | 4.4 | 30.7 | 15.0 | 0.35 | 650 |
| Example 14 | 0.9 | 30.7 | 15.0 | 0.38 | 630 |
| Example 15 | 2.2 | 30.5 | 15.1 | 0.32 | 440 |
| Example 16 | 3.2 | 30.5 | 15.1 | 0.32 | 320 |
| Example 17 | 2.2 | 33.8 | 17.0 | 0.29 | 140 |
| Example 18 | 2.2 | 32.2 | 17.5 | 0.23 | 40 |
| Example 19 | 2.2 | 35.3 | 21.9 | 0.11 | 40 |
| Example 20 | 2.2 | 30.2 | 15.1 | 0.48 | 220 |
| Example 21 | 2.2 | 30.0 | 15.0 | 0.45 | 500 |
| Example 22 | 2.2 | 30.3 | 15.2 | 0.44 | 550 |
| Example 23 | 2.2 | 21.6 | 18.9 | 0.44 | 450 |
| Comparative Example 3 | 2.2 | 5.1 | 15.3 | 0.42 | 1120 |
| Comparative Example 4 | 2.2 | 5.7 | 9.5 | 0.30 | 1190 |
| Comparative Example 5 | 2.2 | 2.0 | 13.0 | 0.12 | 1020 |
| Example 24 | 3.8 | 31.7 | 16.2 | 0.32 | 200 |
| Comparative Example 6 | 3.8 | 5.7 | 8.5 | 0.26 | 800 |

TABLE 2

| | Separator | | | Peel strength (1) Wet adhering temperature range | | | Peel strength (2) Dry adhering temperature range | | |
|---|---|---|---|---|---|---|---|---|---|
| | Film thickness μm | Gurley value s/100 cc | ΔGurley value s/100 cc | Lower limit °C. | Upper limit °C. | Gap °C. | Lower limit °C. | Upper limit °C. | Gap °C. |
| Example 1 | 12 | 197 | 45 | 82 | 95 | 13 | 78 | 102 | 24 |
| Example 2 | 12 | 193 | 41 | 83 | 97 | 14 | 79 | 104 | 25 |
| Example 3 | 12 | 195 | 43 | 83 | 97 | 14 | 82 | 98 | 16 |
| Example 4 | 12 | 203 | 51 | 83 | 95 | 12 | 82 | 95 | 13 |
| Comparative Example 1 | 12 | 194 | 42 | 83 | 93 | 10 | 83 | 95 | 12 |
| Example 5 | 12 | 194 | 42 | 79 | 100 | 21 | 78 | 104 | 26 |
| Example 6 | 12 | 194 | 42 | 81 | 95 | 14 | 78 | 105 | 27 |
| Example 7 | 12 | 199 | 47 | 82 | 95 | 13 | 79 | 104 | 25 |
| Comparative Example 2 | 12 | 194 | 42 | 0.13N/15 mm | | | 83 | 95 | 12 |
| Example 8 | 12 | 193 | 41 | 97 | 118 | 21 | 100 | 117 | 17 |
| Example 9 | 12 | 198 | 46 | 104 | 123 | 19 | 103 | 118 | 15 |
| Example 10 | 12 | 209 | 57 | 105 | 125 | 20 | 104 | 119 | 15 |
| Example 11 | 12 | 218 | 66 | 105 | 123 | 18 | 105 | 120 | 15 |
| Example 12 | 12 | 222 | 70 | 105 | 120 | 15 | 104 | 118 | 14 |

TABLE 2-continued

| | | | | | | | | | |
|---|---|---|---|---|---|---|---|---|---|
| Example 13 | 15 | 230 | 78 | 95 | 120 | 25 | 98 | 120 | 22 |
| Example 14 | 11 | 188 | 36 | | 0.11N/15 mm | | | 0.008N/15 mm | |
| Example 15 | 12 | 193 | 41 | 100 | 118 | 18 | 103 | 117 | 14 |
| Example 16 | 14 | 210 | 58 | 98 | 119 | 21 | 101 | 118 | 17 |
| Example 17 | 12 | 201 | 49 | 98 | 115 | 17 | 102 | 118 | 16 |
| Example 18 | 12 | 203 | 51 | 100 | 120 | 20 | 100 | 115 | 15 |
| Example 19 | 12 | 205 | 53 | 100 | 118 | 18 | 101 | 114 | 13 |
| Example 20 | 12 | 195 | 43 | 99 | 117 | 18 | 102 | 117 | 15 |
| Example 21 | 12 | 195 | 43 | 100 | 116 | 16 | 103 | 116 | 13 |
| Example 22 | 12 | 196 | 44 | 100 | 117 | 17 | 103 | 118 | 15 |
| Example 23 | 12 | 198 | 46 | 94 | 105 | 11 | 101 | 114 | 13 |
| Comparative Example 3 | 12 | 196 | 44 | 95 | 100 | 5 | 100 | 112 | 12 |
| Comparative Example 4 | 12 | 192 | 40 | 102 | 112 | 10 | 105 | 112 | 7 |
| Comparative Example 5 | 11 | 202 | 50 | — | — | — | — | — | — |
| Example 24 | 14 | 199 | 47 | 100 | 118 | 18 | 103 | 117 | 14 |
| Comparative Example 6 | 14 | 198 | 46 | 107 | 115 | 8 | | 0.015N/15 mm | |

| | Battery manufacturing yield | | Peel strength (3) | | Battery load characteristics % |
|---|---|---|---|---|---|
| | Heat-pressing temperature °C. | Class | Heat-pressing temperature °C. | Adhesion strength N/15 mm | |
| Example 1 | 85/90/95 | A | 90 | 0.31 | 92 |
| Example 2 | 85/90/95 | A | 90 | 0.32 | 93 |
| Example 3 | 85/90/95 | B | 90 | 0.33 | 91 |
| Example 4 | 85/90/95 | B | 90 | 0.30 | 90 |
| Comparative Example 1 | 85/90/95 | C | 90 | 0.30 | 84 |
| Example 5 | 85/90/95 | A | 90 | 0.29 | 92 |
| Example 6 | 85/90/95 | A | 90 | 0.24 | 93 |
| Example 7 | 85/90/95 | A | 90 | 0.27 | 91 |
| Comparative Example 2 | 85/90/95 | C | 90 | 0.13 | 84 |
| Example 8 | 100/104/108 | A | 105 | 0.27 | 92 |
| Example 9 | 100/104/108 | A | 105 | 0.26 | 91 |
| Example 10 | 100/104/108 | A | 105 | 0.25 | 91 |
| Example 11 | 100/104/108 | B | 105 | 0.23 | 87 |
| Example 12 | 100/104/108 | B | 105 | 0.23 | 86 |
| Example 13 | 100/104/108 | A | 105 | 0.27 | 83 |
| Example 14 | 100/104/108 | B | 105 | 0.11 | 85 |
| Example 15 | 100/104/108 | A | 105 | 0.30 | 92 |
| Example 16 | 100/104/108 | A | 105 | 0.30 | 91 |
| Example 17 | 100/104/108 | A | 105 | 0.29 | 92 |
| Example 18 | 100/104/108 | A | 105 | 0.28 | 91 |
| Example 19 | 100/104/108 | B | 105 | 0.26 | 90 |
| Example 20 | 100/104/108 | A | 105 | 0.28 | 91 |
| Example 21 | 100/104/108 | B | 105 | 0.25 | 90 |
| Example 22 | 100/104/108 | A | 105 | 0.26 | 91 |
| Example 23 | 100/104/108 | B | 105 | 0.21 | 90 |
| Comparative Example 3 | 100/104/108 | C | 105 | 0.11 | 82 |
| Comparative Example 4 | 100/104/108 | C | 105 | 0.23 | 85 |
| Comparative Example 5 | — | — | — | — | — |
| Example 24 | 100/104/108 | A | 105 | 0.20 | 92 |
| Comparative Example 6 | 100/104/108 | C | 105 | 0.14 | 83 |

FIG. 1 illustrates a relationship between the peeling strength (1) between an electrode and a separator and the heat-pressing temperature for Example 1, Example 2, and Comparative Example 1. In Example 1, the wet adhering temperature range (the range of the heat-pressing temperature where the peel strength is 0.2 N/15 mm or more) has the lower limit value of 82° C. and the upper limit value of 95° C., and the gap therebetween is 13° C. In Example 2, the wet adhering temperature range has the lower limit value of 83° C. and the upper limit value of 97° C., and the gap therebetween is 14° C. In Comparative Example 1, the wet adhering temperature range has the lower limit value of 83° C. and the upper limit value of 93° C., and the gap therebetween is 10° C. The present embodiment having an area intensity ratio of the β-phase-crystal-derived peak of the PVDF resin in the adhesive porous layer of from 10% to 100% has a wide wet adhering temperature range.

The disclosure of Japanese Patent Application No. 2015-061570, filed on Mar. 24, 2015, is incorporated herein by reference in their entirety. The disclosure of Japanese Patent Application No. 2015-111461, filed on Jun. 1, 2015, is incorporated herein by reference in their entirety.

All publications, patent applications, and technical standards mentioned in this specification are herein incorporated by reference to the same extent as if each individual publication, patent application, or technical standard was specifically and individually indicated to be incorporated by reference.

What is claimed is:

1. A separator for a non-aqueous secondary battery, the separator comprising:
   a porous substrate; and
   an adhesive porous layer provided on one or both sides of the porous substrate and comprising a polyvinylidene fluoride-based resin and a filler,
   the adhesive porous layer exhibits a ratio of an area intensity of a β-phase-crystal-derived peak of the polyvinylidene fluoride-based resin to a sum of an area intensity of an α-phase-crystal-derived peak of the polyvinylidene fluoride-based resin and the area intensity of the β-phase-crystal-derived peak of the polyvinylidene fluoride-based resin of from 10% to 100% when an x-ray diffraction spectrum is obtained by performing measurement by an x-ray diffraction method,
   wherein a content of the filler is less than 80% by mass and 10% by mass or more, based on a total amount of the polyvinylidene fluoride-based resin and the filler,
   an average primary particle size of the filler is from 0.01 μm to 10 μm, and
   the filler includes at least one selected from the group consisting of a metal hydroxide, a metal oxide, a metal carbonate, and a metal sulfate.

2. The separator for a non-aqueous secondary battery according to claim 1, wherein the adhesive porous layer exhibits the ratio of the area intensity of the β-phase-crystal-derived peak of the polyvinylidene fluoride-based resin to the sum of the area intensity of the α-phase-crystal-derived peak of the polyvinylidene fluoride-based resin and the area intensity of the β-phase-crystal-derived peak of the polyvinylidene fluoride-based resin is from 10% to 35% when the x-ray diffraction spectrum is obtained by performing measurement by the x-ray diffraction method.

3. The separator for a non-aqueous secondary battery according to claim 1, wherein the adhesive porous layer would exhibit exhibits a half-width of an endothermic peak of from 15° C. to 30° C. when a differential scanning calorimetry curve is obtained by differential scanning calorimetry.

4. The separator for a non-aqueous secondary battery according to claim 1, wherein a weight of the adhesive porous layer on one side of the porous substrate is from 0.5 g/m² to 2.0 g/m².

5. The separator for a non-aqueous secondary battery according to claim 1, wherein a peel strength between the porous substrate and the adhesive porous layer is from 0.20 N/12 mm to 1.20 N/12 mm.

6. The separator for a non-aqueous secondary battery according to claim 1, wherein a value obtained by subtracting a Gurley value of the porous substrate from a Gurley value of the separator for a non-aqueous secondary battery is 90 seconds/100 cc or less.

7. A non-aqueous secondary battery comprising:
   a positive electrode;
   a negative electrode; and
   the separator for a non-aqueous secondary battery according to claim 1, which is disposed between the positive electrode and the negative electrode,
   the non-aqueous secondary battery being configured to produce an electromotive force by lithium doping/de-doping.

8. The separator for a non-aqueous secondary battery according to claim 1, wherein the polyvinylidene fluoride-based resin is a copolymer including vinylidene fluoride and hexafluoropropylene.

9. The separator for a non-aqueous secondary battery according to claim 1, wherein a weight average molecular weight of the polyvinylidene fluoride-based resin is from 300,000 to 3,000,000.

10. The separator for a non-aqueous secondary battery according to claim 1, wherein the adhesive porous layer exhibits the ratio of the area intensity of the β-phase-crystal-derived peak of the polyvinylidene fluoride-based resin to the sum of the area intensity of the α-phase-crystal-derived peak of the polyvinylidene fluoride-based resin and the area intensity of the β-phase-crystal-derived peak of the polyvinylidene fluoride-based resin of from 10% to 25% or from 50% to 100% when an x-ray diffraction spectrum is obtained by performing measurement by an x-ray diffraction method.

11. The separator for a non-aqueous secondary battery according to claim 10, wherein the adhesive porous layer exhibits the ratio of the area intensity of the β-phase-crystal-derived peak of the polyvinylidene fluoride-based resin to the sum of the area intensity of the α-phase-crystal-derived peak of the polyvinylidene fluoride-based resin and the area intensity of the β-phase-crystal-derived peak of the polyvinylidene fluoride-based resin of from 10% to 25% when an x-ray diffraction spectrum is obtained by performing measurement by an x-ray diffraction method.

12. The separator for a non-aqueous secondary battery according to claim 10, wherein the adhesive porous layer exhibits the ratio of the area intensity of the β-phase-crystal-derived peak of the polyvinylidene fluoride-based resin to the sum of the area intensity of the α-phase-crystal-derived peak of the polyvinylidene fluoride-based resin and the area intensity of the β-phase-crystal-derived peak of the polyvinylidene fluoride-based resin of from 50% to 100% when an x-ray diffraction spectrum is obtained by performing measurement by an x-ray diffraction method.

* * * * *